(12) United States Patent
Saito

(10) Patent No.: US 11,073,684 B2
(45) Date of Patent: Jul. 27, 2021

(54) ZOOM LENS AND IMAGE PICKUP APPARATUS INCLUDING THE SAME

(71) Applicant: CANON KABUSHIKI KAISHA, Tokyo (JP)

(72) Inventor: Shinichiro Saito, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 120 days.

(21) Appl. No.: 15/838,935

(22) Filed: Dec. 12, 2017

(65) Prior Publication Data

US 2018/0164558 A1 Jun. 14, 2018

(30) Foreign Application Priority Data

Dec. 13, 2016 (JP) ............................. JP2016-241043

(51) Int. Cl.
*G02B 15/14* (2006.01)
*G02B 15/173* (2006.01)
(Continued)

(52) U.S. Cl.
CPC ... *G02B 15/143105* (2019.08); *G02B 15/173* (2013.01); *G02B 27/0025* (2013.01);
(Continued)

(58) Field of Classification Search
CPC ........ G02B 13/02; G02B 13/18; G02B 15/00; G02B 15/14; G02B 15/15; G02B 15/155;
(Continued)

(56) References Cited

U.S. PATENT DOCUMENTS

| 5,585,966 A | * | 12/1996 | Suzuki | ................. | G02B 15/173 |
| | | | | | 359/554 |
| 2004/0070844 A1 | * | 4/2004 | Sato | ..................... | G02B 27/646 |
| | | | | | 359/687 |

(Continued)

FOREIGN PATENT DOCUMENTS

| JP | H09-90226 A | 4/1997 |
| JP | 2010-145759 A | 7/2010 |

(Continued)

OTHER PUBLICATIONS

Japanese Office Action for application No. 2016241043 dated Apr. 2, 2019 with English Translation.
Japanese Decision of Refusal for application No. 2016241043 dated Jul. 30, 2019 with English translation.

*Primary Examiner* — Travis S Fissel
(74) *Attorney, Agent, or Firm* — Carter, DeLuca & Farrell LLP

(57) ABSTRACT

A zoom lens includes in order from an object side to an image side: a first lens unit having a positive refractive power; a second lens unit having a negative refractive power; and a rear lens group which includes at least one lens unit and has a positive refractive power as a whole. Distances between the adjacent lens units change during zooming. The rear lens group includes a lens P1 that has a positive refractive power and moves at image stabilization so as to have a component perpendicular to the optical axis. The shape factor SFP1 of the lens P1, a curvature radius R1P1 of a lens surface of the lens P1 on the object side, and a curvature radius R2P1 of a lens surface of the lens P1 on the image side are appropriately determined.

13 Claims, 16 Drawing Sheets

(51) Int. Cl.
    *G02B 27/00* (2006.01)
    *G02B 13/02* (2006.01)
    *G02B 27/64* (2006.01)
    *G02B 13/18* (2006.01)

(52) U.S. Cl.
    CPC .............. *G02B 13/02* (2013.01); *G02B 13/18* (2013.01); *G02B 27/646* (2013.01)

(58) Field of Classification Search
    CPC .. G02B 15/16; G02B 15/173; G02B 27/0025; G02B 27/646; G02B 14/144105; G02B 14/143105
    USPC ................................ 359/683, 684, 686–690
    See application file for complete search history.

(56) References Cited

U.S. PATENT DOCUMENTS

| | | | |
|---|---|---|---|
| 2012/0162482 A1* | 6/2012 | Yoshinaga | G02B 13/18 348/240.1 |
| 2013/0242166 A1* | 9/2013 | Hosoi | G02B 15/14 348/345 |
| 2014/0118603 A1 | 5/2014 | Saito | |

FOREIGN PATENT DOCUMENTS

| | | |
|---|---|---|
| JP | 2011-128371 A | 6/2011 |
| JP | 2012141646 A | 7/2012 |
| WO | 2011099249 A1 | 8/2011 |

* cited by examiner

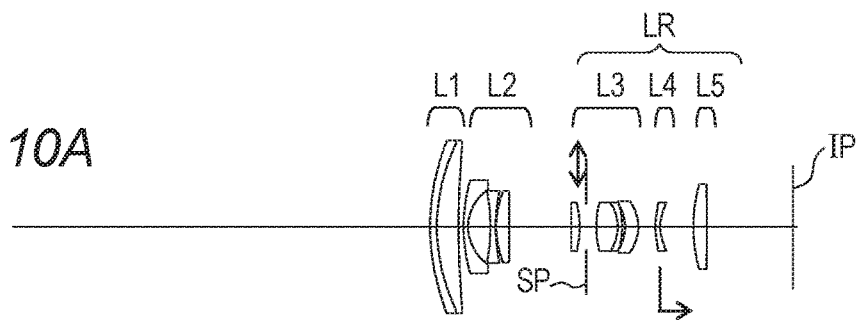
FIG. 10A
FIG. 10B
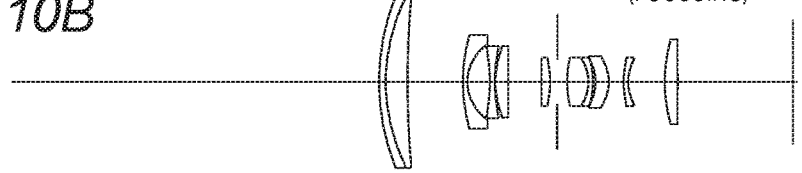
FIG. 10C
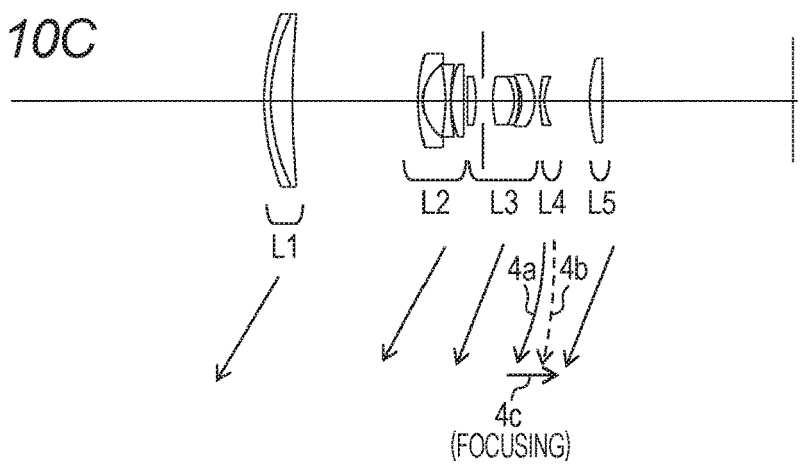
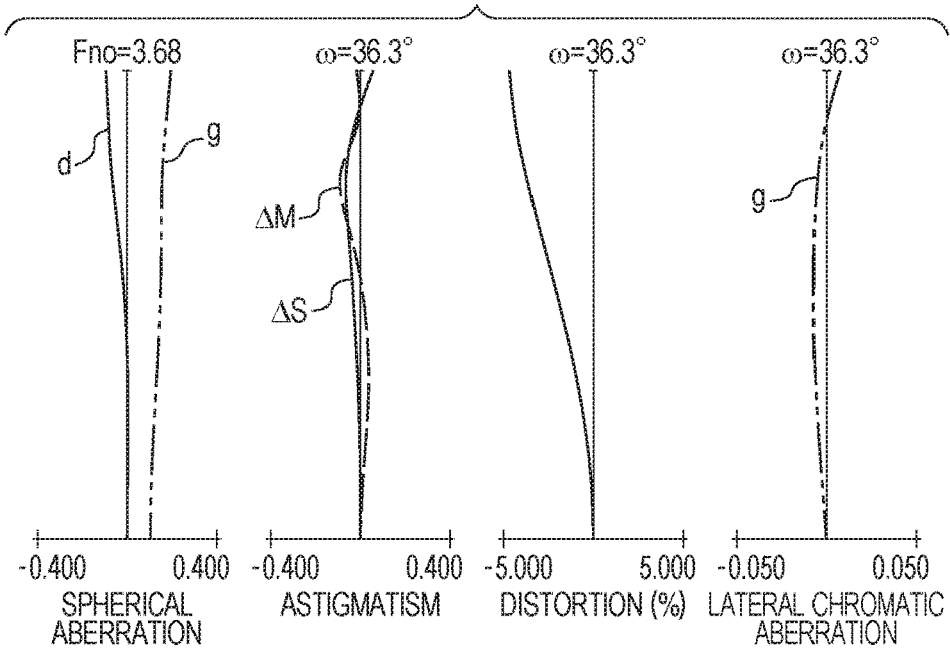
FIG. 11A

ZOOM LENS AND IMAGE PICKUP APPARATUS INCLUDING THE SAME

BACKGROUND OF THE INVENTION

Field of the Invention

The present invention relates to a zoom lens and an image pickup apparatus.

Description of the Related Art

In recent years, the pickup optical system used in image pickup apparatuses is required to be a compact zoom lens with a short total lens length, which has a high zoom ratio and uses a focusing method implementing high-speed focusing. Moreover, the pickup optical system is required to have an anti-vibration function to correct blur (image blur) in taken images caused by shake or the like and prevent degradation of optical performances. Some conventionally known zoom lenses use an inner focusing method and perform image stabilization by using some of lens units that constitute the zoom lens.

Japanese Patent Application Laid-Open No. H09-90226 discloses a zoom lens which includes, in order from the object side to the image side, first to fifth lens units which have positive, negative, positive, positive, and negative refractive powers, respectively, and changes distances between the adjacent lens units during zooming. In the Japanese Patent Application Laid-Open No. H09-90226, focusing is performed by using the third lens unit while image stabilization is performed by using the fourth lens unit.

Japanese Patent Application Laid-Open No. 2011-128371 discloses a zoom lens which includes, in order from the object side to the image side, first to fifth lens units which have positive, negative, positive, positive, and positive refractive powers respectively and changes distances between the adjacent lens units during zooming. In the Japanese Patent Application Laid-Open No. 2011-128371, focusing is performed by using the third lens unit while image stabilization is performed by using the fourth lens unit.

Japanese Patent Application Laid-Open No. 2010-145759 discloses a zoom lens which includes, in order from the object side to the image side, first to fourth lens units which have positive, negative, positive, and positive refractive powers respectively and changes distances between the adjacent lens units during zooming. In the Japanese Patent Application Laid-Open No. 2010-145759, focusing is performed by using a part of the fourth lens unit while image stabilization is performed by using all or a part of the third lens unit.

SUMMARY OF THE INVENTION

Zoom lenses are required to be compact as a whole while having a high zoom ratio and achieving high optical performances throughout the entire zoom range and object distance. Moreover, zoom lenses are required to maintain high optical performances at image stabilization.

Especially when a large image pickup apparatus using an image pickup element is equipped with a correction lens unit that is moved for image stabilization in a direction perpendicular to the optical axis, the correction lens unit is required to be compact and lightweight in order that the mechanism to move the correction lens unit can be downsized and achieve power saving. To satisfy these requirements, it is important to appropriately select the zoom type (the number of lens units, refractive power of each lens unit, and the like) and the lens unit for image stabilization and appropriately set the lens configuration such as refractive powers thereof.

An object of the present invention is to provide a compact zoom lens which has a high zoom ratio while easily maintaining high optical performances at image stabilization and provide an image pickup apparatus including the zoom lens.

A zoom lens of one aspect of the present invention includes in order from an object side to an image side: a first lens unit having a positive refractive power; a second lens unit having a negative refractive power; and a rear lens group which includes at least one lens unit and has a positive refractive power as a whole. Distances between the adjacent lens units change during zooming. The rear lens group includes a lens P1 that has a positive refractive power and moves at image stabilization so as to have a component perpendicular to the optical axis, and the following conditional expression is satisfied: $-2.5 < SFP1 < -0.5$ where $SFP1$ is a shape factor of the lens P1 which is expressed by $SFP1 = (R2P1 + R1P1)/(R2P1 - R1P1)$. Herein, R1P1 is a curvature radius of a lens surface of the lens P1 on the object side while R2P1 is a curvature radius of a lens surface of the lens P1 on the image side.

Further features of the present invention will become apparent from the following description of exemplary embodiments with reference to the attached drawings.

BRIEF DESCRIPTION OF THE DRAWINGS

FIG. 3AT is a lateral aberration diagram at a telephoto end of the zoom lens of Embodiment 1 before image position displacement of 0.3 degrees.

FIG. 3BT is a lateral aberration diagram at the telephoto end of the zoom lens of Embodiment 1 after image position displacement of 0.3 degrees.

FIG. 6AT is a lateral aberration diagram at a telephoto end of the zoom lens of Embodiment 2 before image position displacement of 0.3 degrees.

FIG. 6BT is a lateral aberration diagram at the telephoto end of the zoom lens of Embodiment 2 after image position displacement of 0.3 degrees.

FIG. 9AT is a lateral aberration diagram at a telephoto end of the zoom lens of Embodiment 3 before image position displacement of 0.3 degrees.

FIG. 9BT is a lateral aberration diagram at the telephoto end of the zoom lens of Embodiment 3 after image position displacement of 0.3 degrees.

FIG. 10A is a lens cross-sectional view at a wide-angle end of Embodiment 4.

FIG. 10B is a lens cross-sectional view at a middle zoom position of Embodiment 4.

FIG. 10C is a lens cross-sectional view at a telephoto end of Embodiment 4.

FIG. 11A is an aberration diagram at the wide-angle end of Embodiment 4.

FIG. 12AT is a lateral aberration diagram at a telephoto end of the zoom lens of Embodiment 4 before image position displacement of 0.3 degrees.

FIG. 12BT is a lateral aberration diagram at the telephoto end of the zoom lens of Embodiment 4 after image position displacement of 0.3 degrees.

FIG. 15AT is a lateral aberration diagram at a telephoto end of the zoom lens of Embodiment 5 before image position displacement of 0.3 degrees.

FIG. 15BT is a lateral aberration diagram at the telephoto end of the zoom lens of Embodiment 5 after image position displacement of 0.3 degrees.

DESCRIPTION OF THE EMBODIMENTS

Preferred embodiments of the present invention will now be described in detail in accordance with the accompanying drawings. A zoom lens of the present invention includes the following lens units arranged in order from the object side to the image side. The zoom lens includes a first lens unit L1 having a positive refractive power (optical power=the reciprocal of focal length), a second lens unit L2 having a negative refractive power, and a rear lens group LR which includes at least one lens unit and has a positive refractive power as a whole.

At zooming, the lens units move so that distances between the adjacent lens units change. The lens unit closest to an object in the rear lens group LR or the lens closest to the object is referred to as a lens P1. The lens P1 has a positive refractive power. The lens P1 moves so as to have a component perpendicular to the optical axis as a correction lens unit for image stabilization.

Figure 1A:
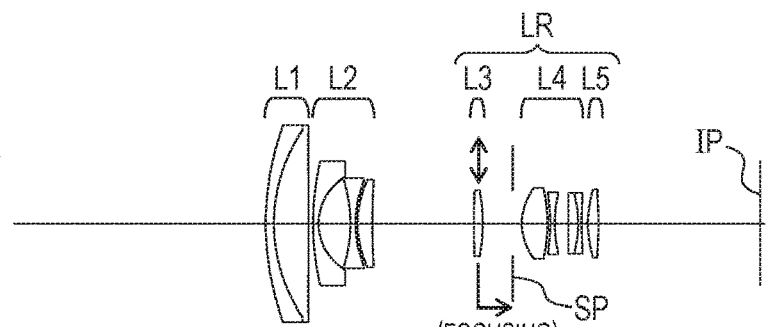
FIG. 1A is a lens cross-sectional view at a wide-angle end of Embodiment 1.
Figure 1B:
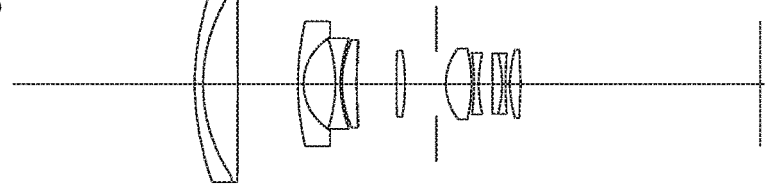
FIG. 1B is a lens cross-sectional view at a middle zoom position of Embodiment 1.
Figure 1C:
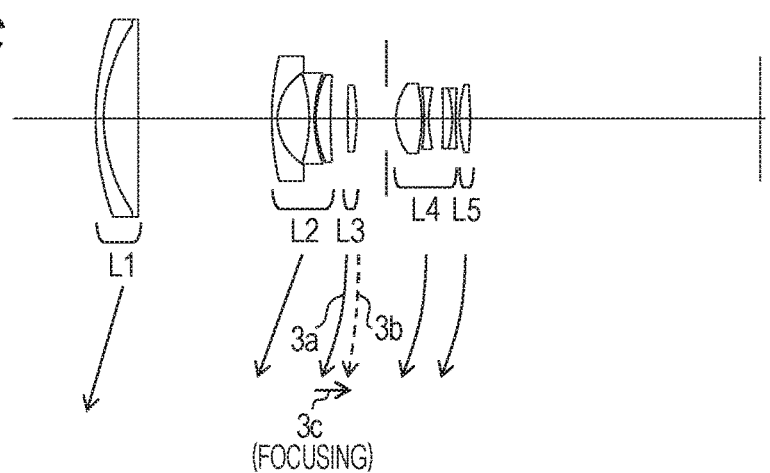
FIG. 1C is a lens cross-sectional view at a telephoto end of Embodiment 1.
Figure 2A:
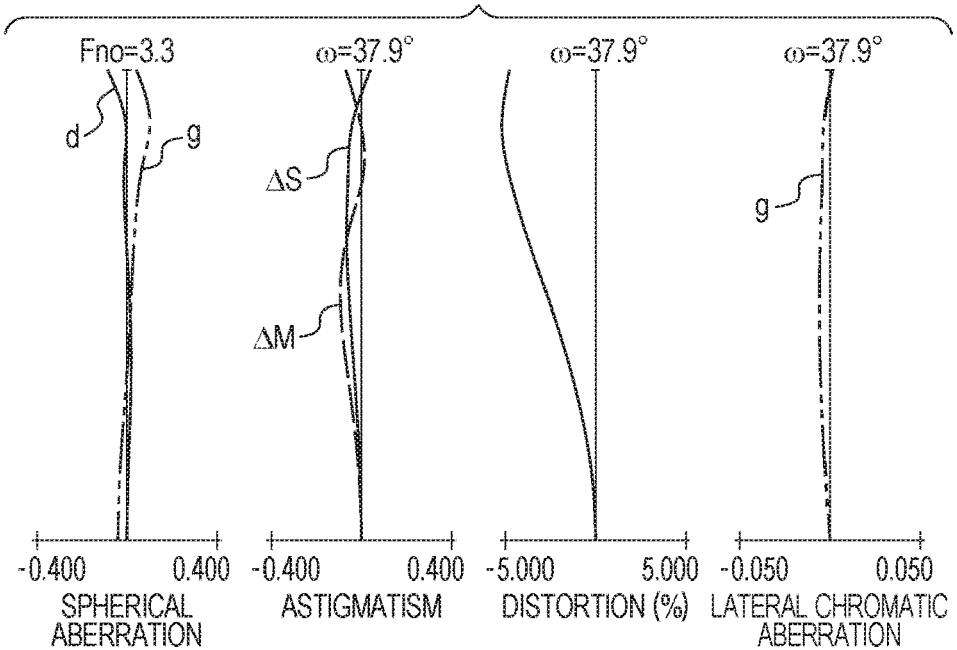
FIG. 2A is an aberration diagram at the wide-angle end of Embodiment 1.
Figure 2B:
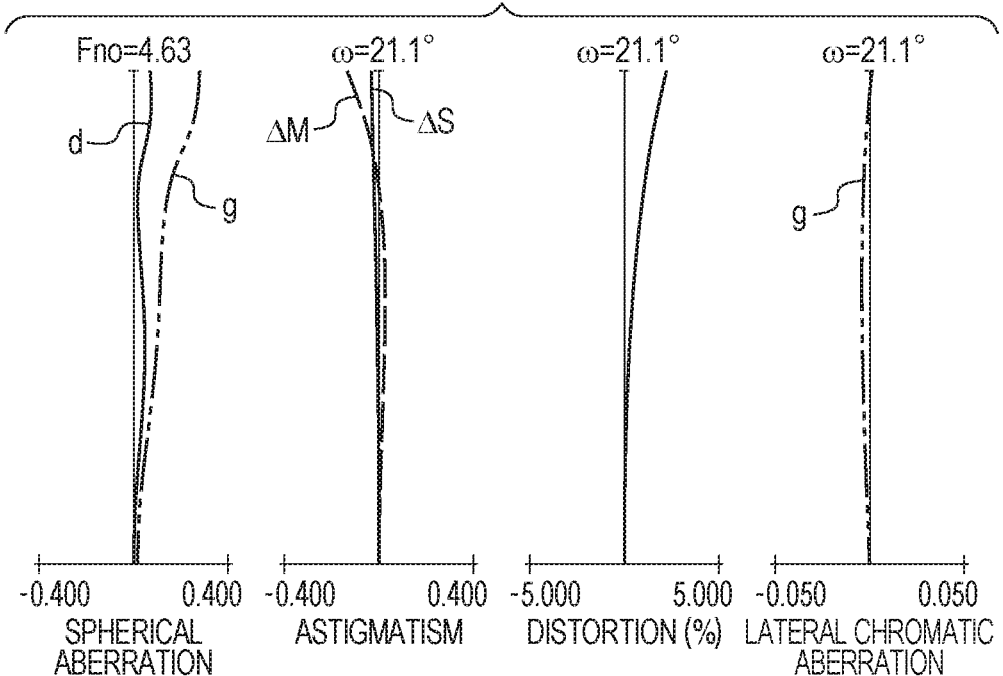
FIG. 2B is an aberration diagram at the middle zoom position of Embodiment 1.
Figure 2C:
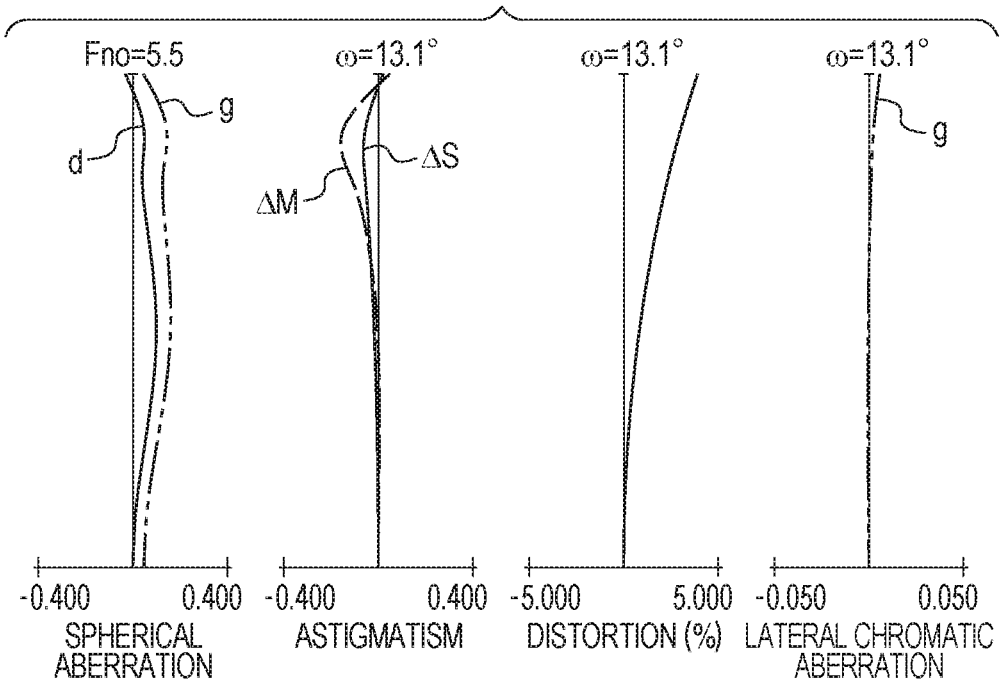
FIG. 2C is an aberration diagram at the telephoto end of Embodiment 1.
Figure 3A:
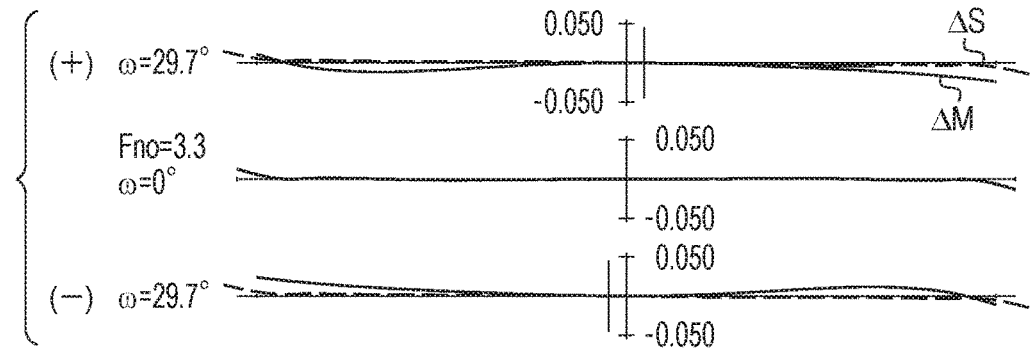
FIG. 3AW is a lateral aberration diagram at the wide-angle end of the zoom lens of Embodiment 1 before image position displacement of 0.3 degrees.
Figure 3A:
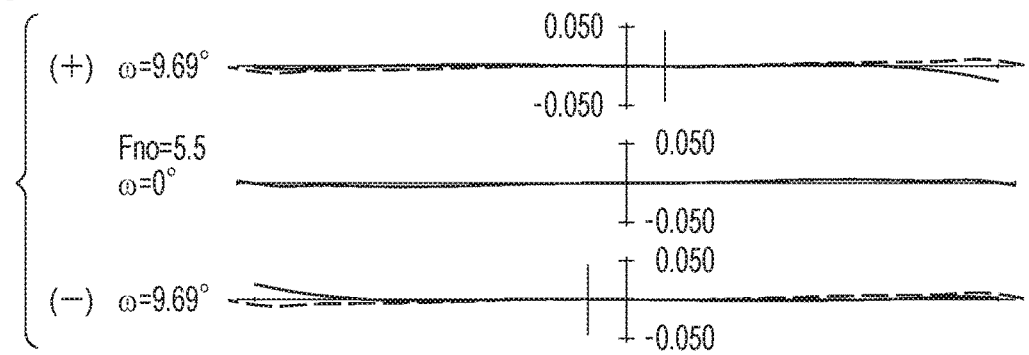
Figure 3B:
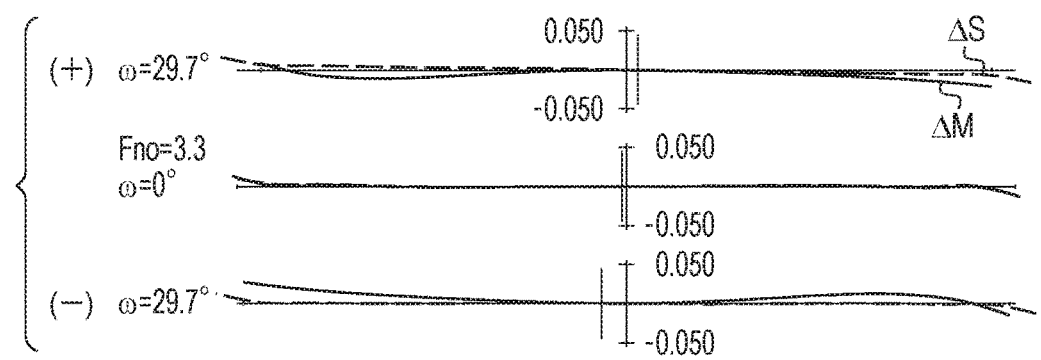
FIG. 3BW is a lateral aberration diagram at a wide-angle end of the zoom lens of Embodiment 1 after image position displacement of 0.3 degrees.
Figure 3B:
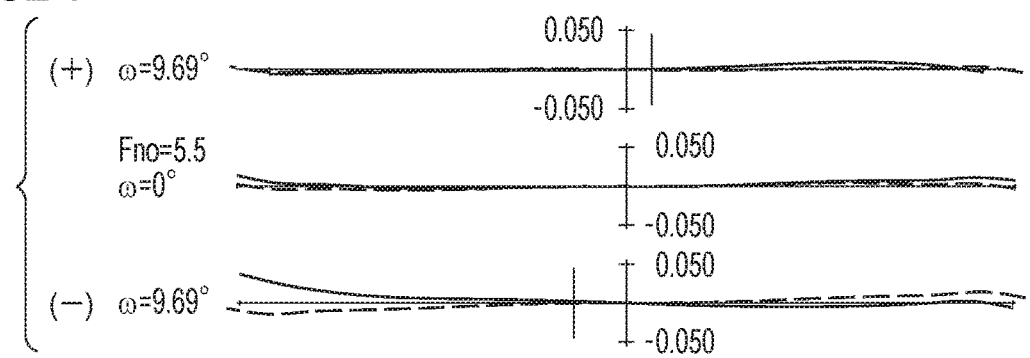

FIGS. 1A, 1B, and 1C are lens cross-sectional views of a zoom lens of Embodiment 1 of the present invention at the wide-angle end (the short focal length end), a middle zoom position, and the telephoto end (the long focal length end), respectively. FIGS. 2A, 2B, and 2C are aberration diagrams of the zoom lens of Embodiment 1 at the wide-angle end, middle zoom position, and telephoto end, respectively. FIGS. 3AW and 3AT are lateral aberration diagrams of the zoom lens of Embodiment 1 at the wide-angle end and telephoto end, respectively. FIGS. 3BW and 3BT are lateral aberration diagrams of the zoom lens of Embodiment 1 at the wide-angle end and telephoto end after 0.3 degree-image stabilization, respectively. The zoom lens of Embodiment 1 has a zoom ratio of 3.34 and an aperture ratio (F-number) of about 3.30 to 5.50.

Figure 4A:
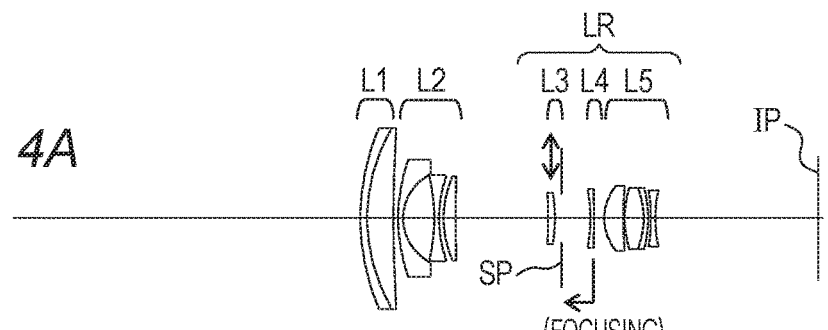
FIG. 4A is a lens cross-sectional view at a wide-angle end of Embodiment 2.
Figure 4B:
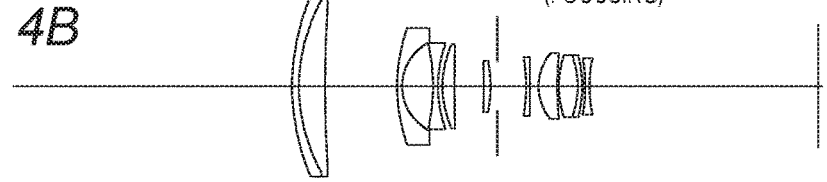
FIG. 4B is a lens cross-sectional view at a middle zoom position of Embodiment 2.
Figure 4C:
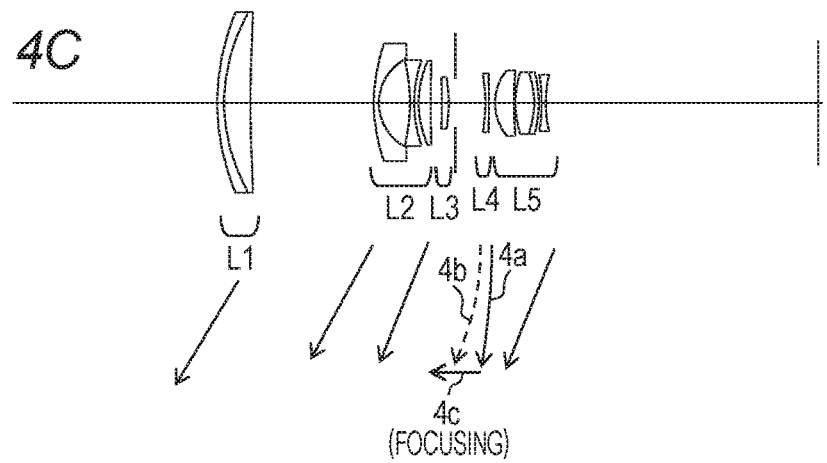
FIG. 4C is a lens cross-sectional view at a telephoto end of Embodiment 2.
Figure 5A:
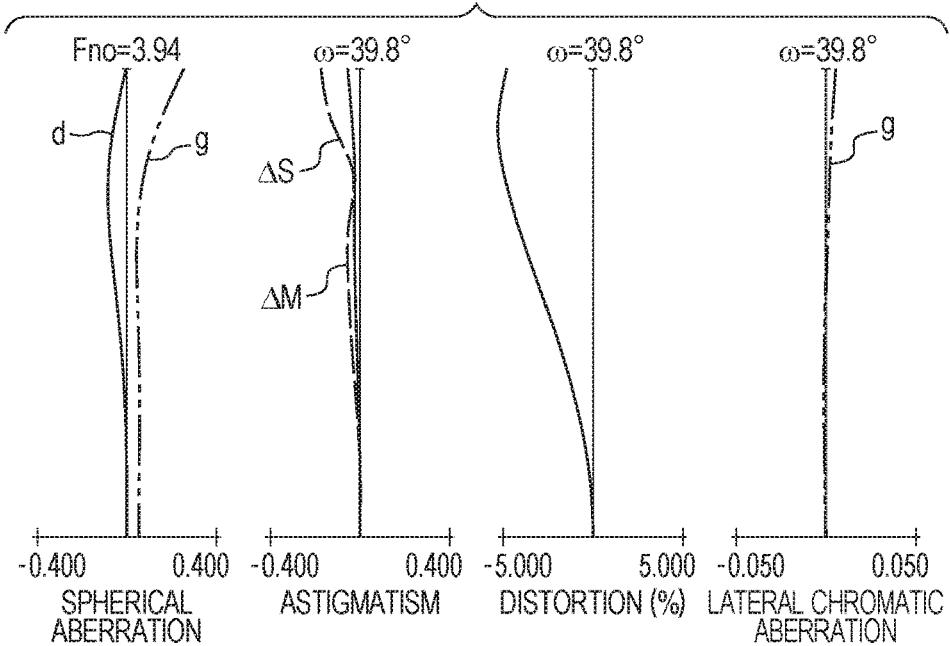
FIG. 5A is aberration diagram at the w middle zoom position of Embodiment 2.
Figure 5B:
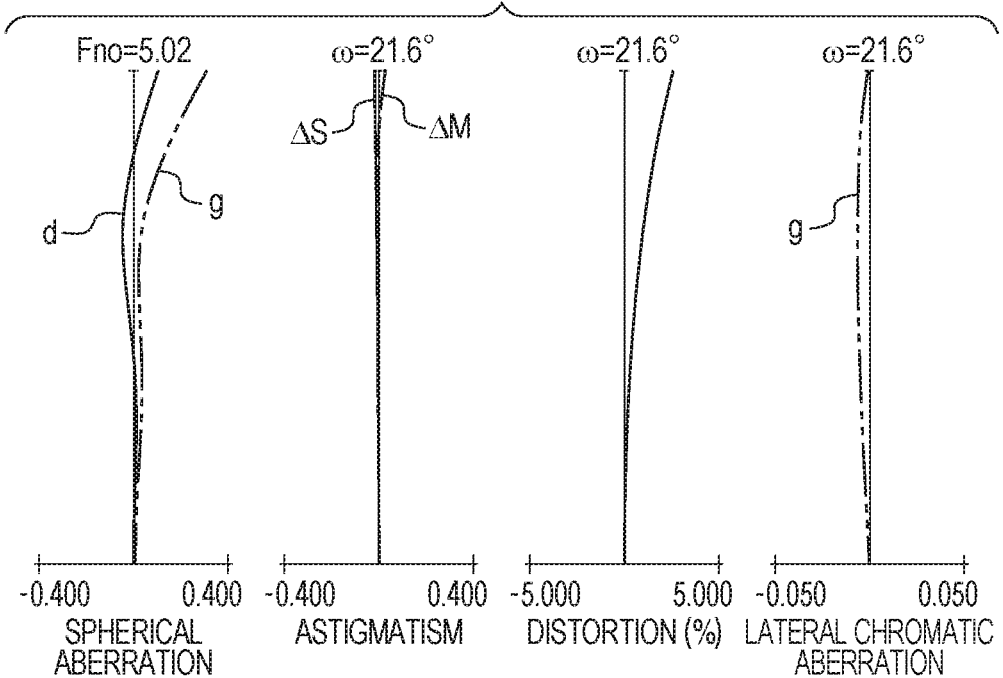
FIG. 5B is aberration diagram at the telephoto end of Embodiment 2.
Figure 5C:
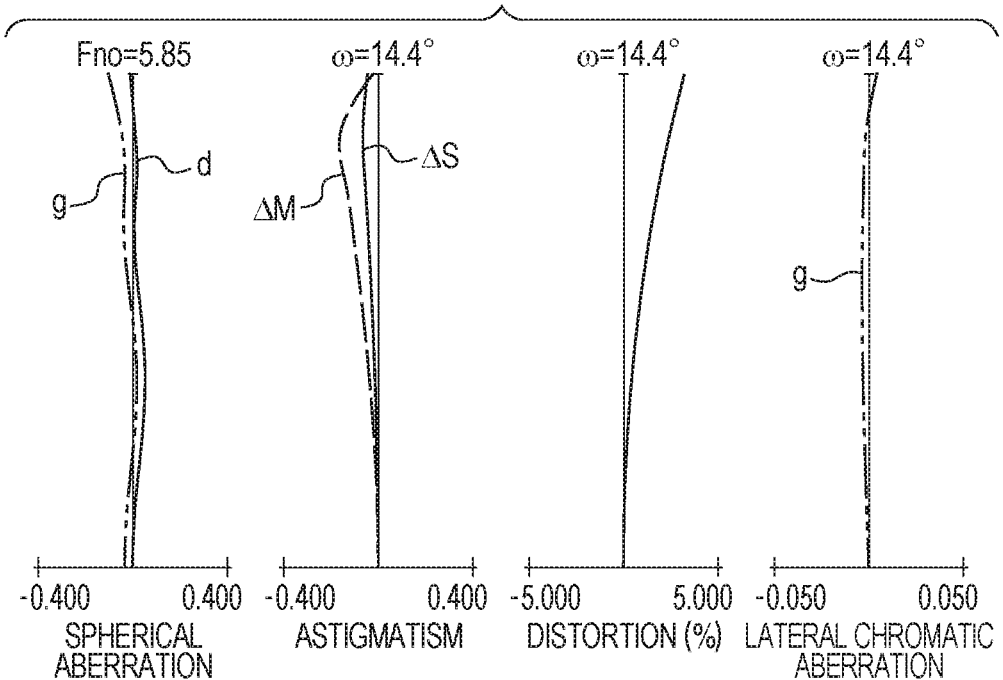
FIG. 5C is aberration diagram at the wide-angle end of Embodiment 2.
Figure 6A:
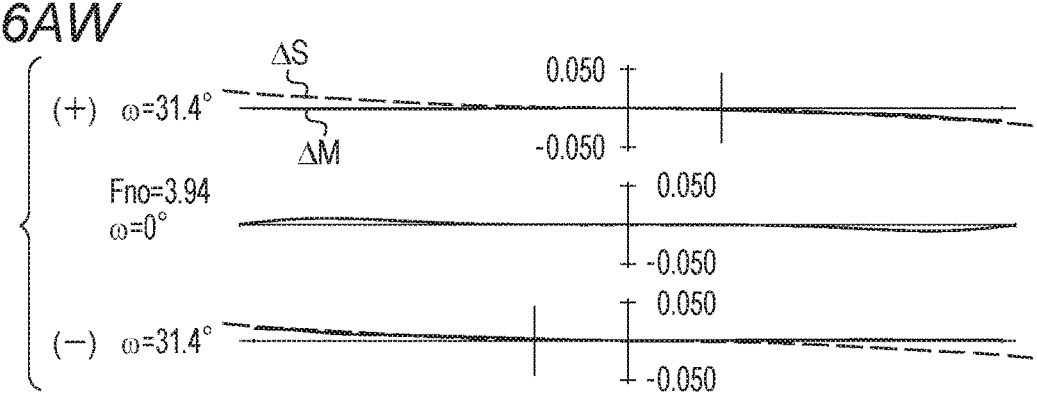
FIG. 6AW is a lateral aberration diagram at the wide-angle end of the zoom lens of Embodiment 2 before image position displacement of 0.3 degrees.
Figure 6A:
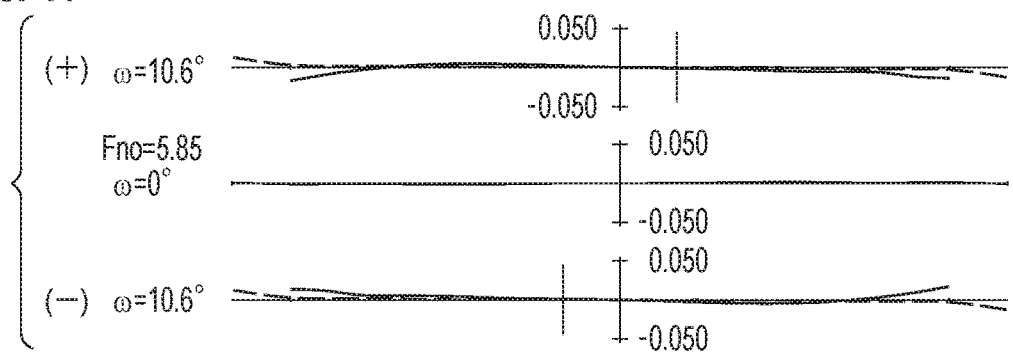
Figure 6B:
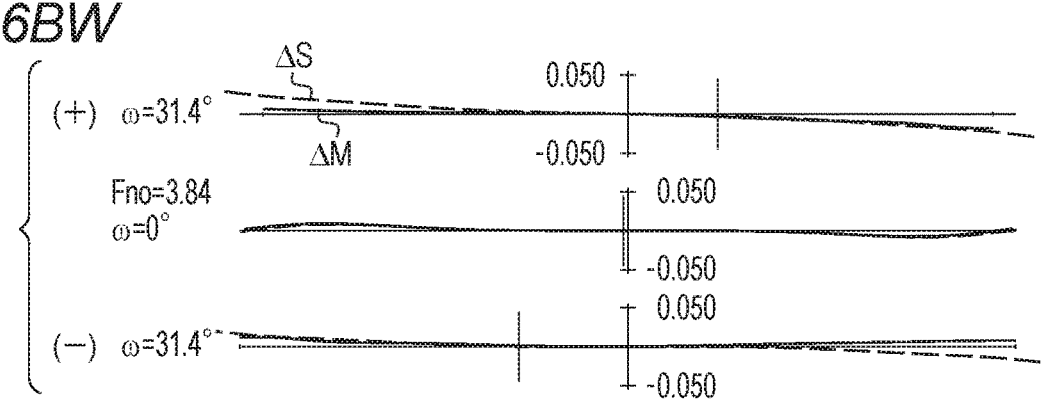
FIG. 6BW is a lateral aberration diagram at a wide-angle end of the zoom lens of Embodiment 2 after image position displacement of 0.3 degrees.
Figure 6B:
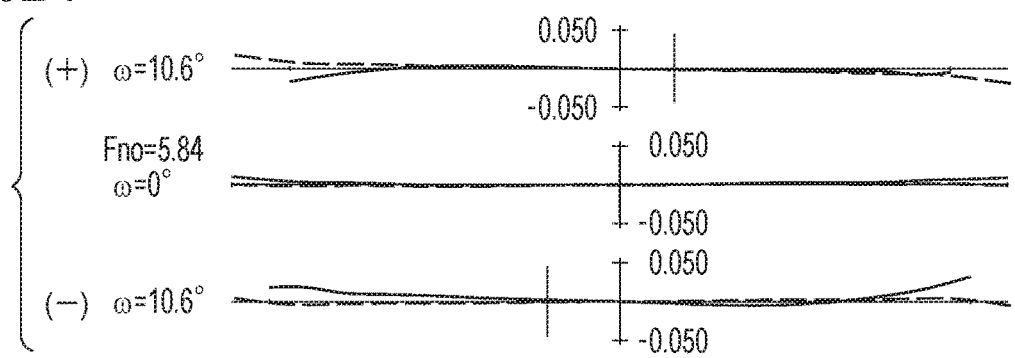

FIGS. 4A, 4B, and 4C are lens cross-sectional views of a zoom lens of Embodiment 2 of the present invention at the wide-angle end, middle zoom position, and telephoto end, respectively. FIGS. 5A, 5B, and 5C are aberration diagrams of the zoom lens of Embodiment 2 at the wide-angle end, middle zoom position, and telephoto end, respectively. FIGS. 6AW and EAT are lateral aberration diagrams of the zoom lens of Embodiment 2 at the wide-angle end and telephoto end, respectively. FIGS. 6BW and 6BT are lateral aberration diagrams of the zoom lens of Embodiment 2 after 0.3 degree-image stabilization at the wide-angle end and telephoto end, respectively. The zoom lens of Embodiment 2 has a zoom ratio of 3.25 and an aperture ratio of about 3.84 to 5.84.

Figure 7A:
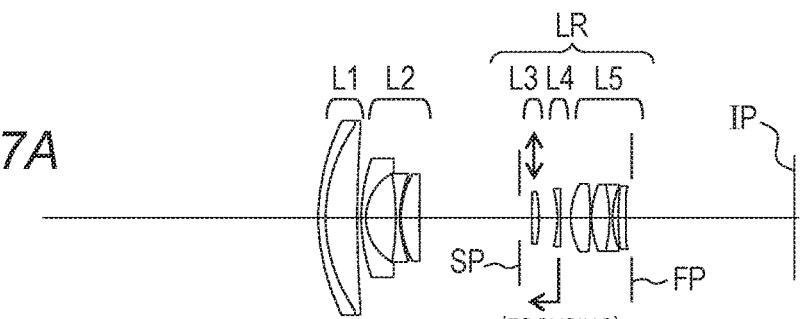
FIG. 7A is a lens cross-sectional view at a wide-angle end of Embodiment 3.
Figure 7B:
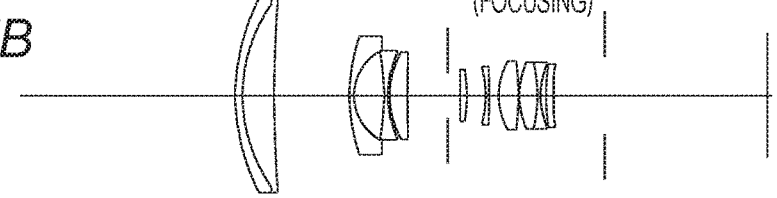
FIG. 7B is a lens cross-sectional view at a middle zoom position of Embodiment 3.
Figure 7C:
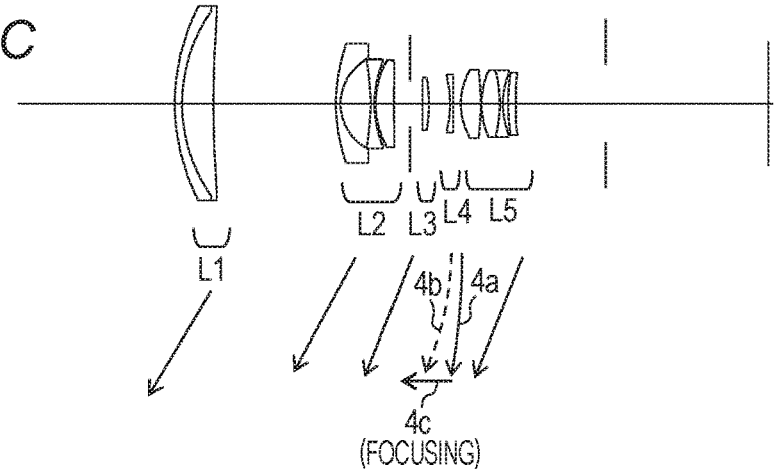
FIG. 7C is a lens cross-sectional view at a telephoto end of Embodiment 3.
Figure 8A:
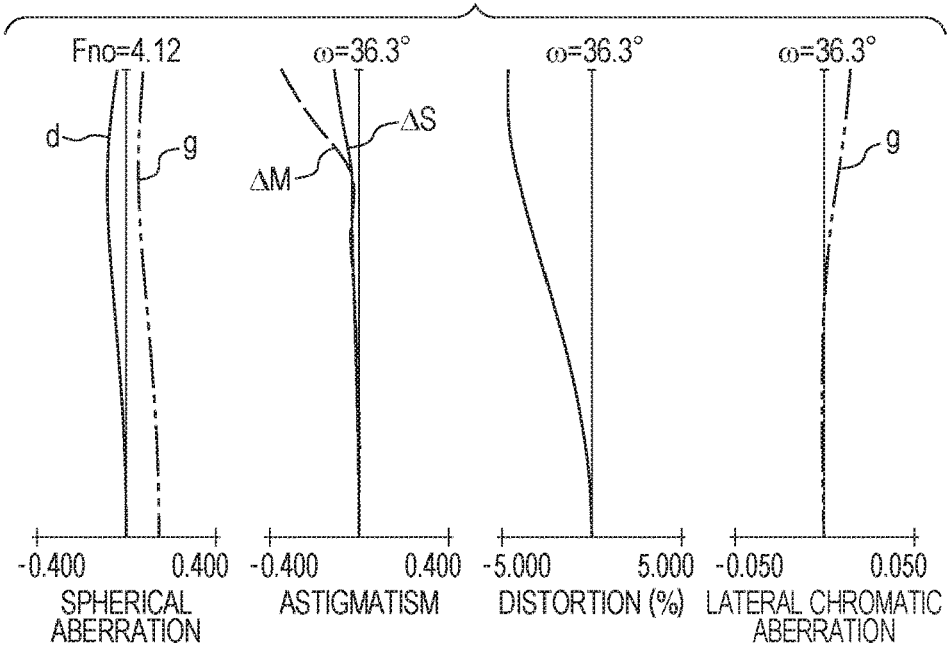
FIG. 8A is an aberration diagram at the wide-angle end of Embodiment 3.
Figure 8B:
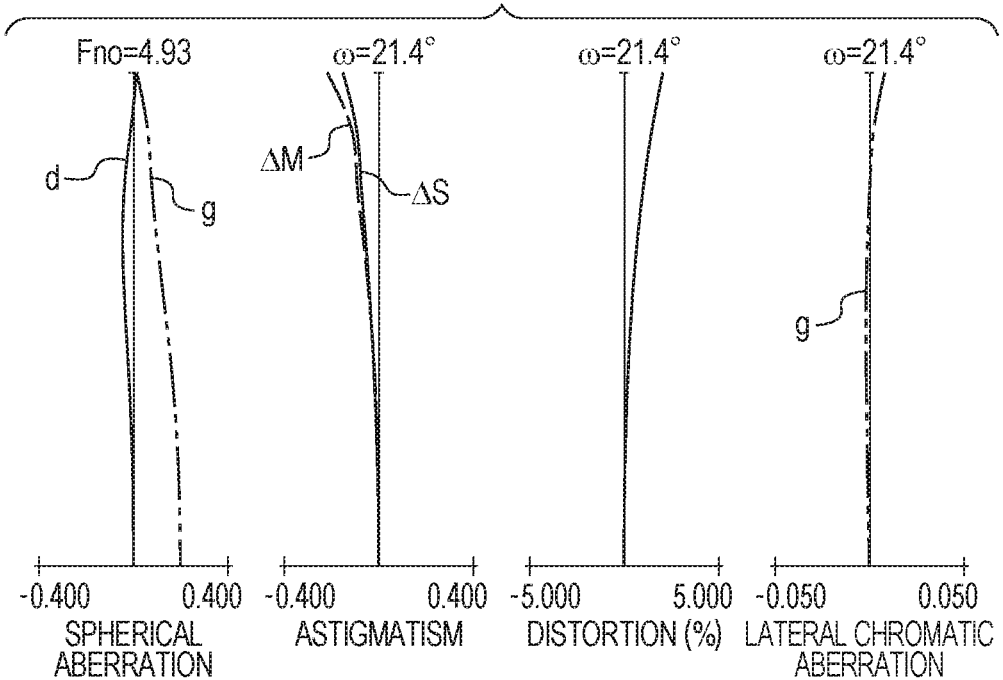
FIG. 8B is an aberration diagram at the middle zoom position of Embodiment 3.
Figure 8C:
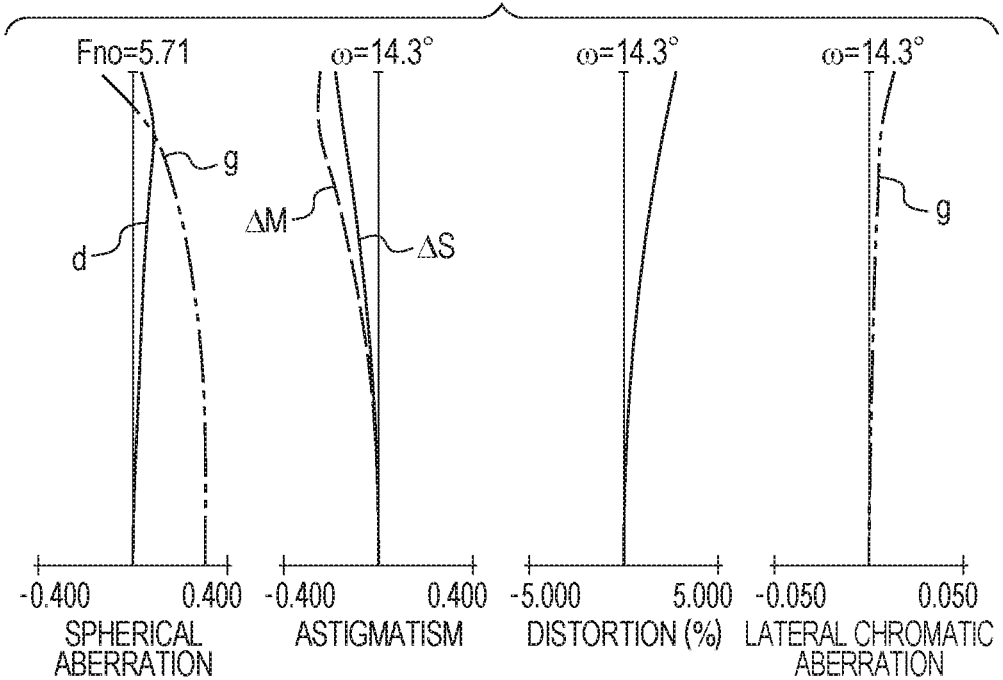
FIG. 8C is an aberration diagram at the telephoto end of Embodiment 3.
Figure 9A:
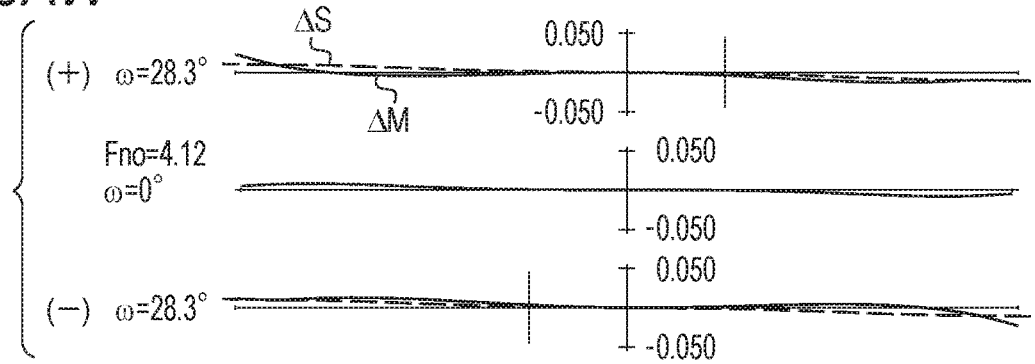
FIG. 9AW is a lateral aberration diagram at the wide-angle end of the zoom lens of Embodiment 3 before image position displacement of 0.3 degrees.
Figure 9A:
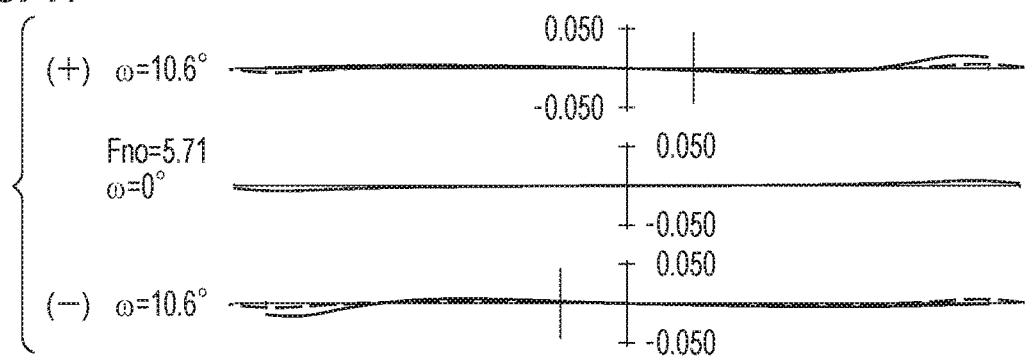
Figure 9B:
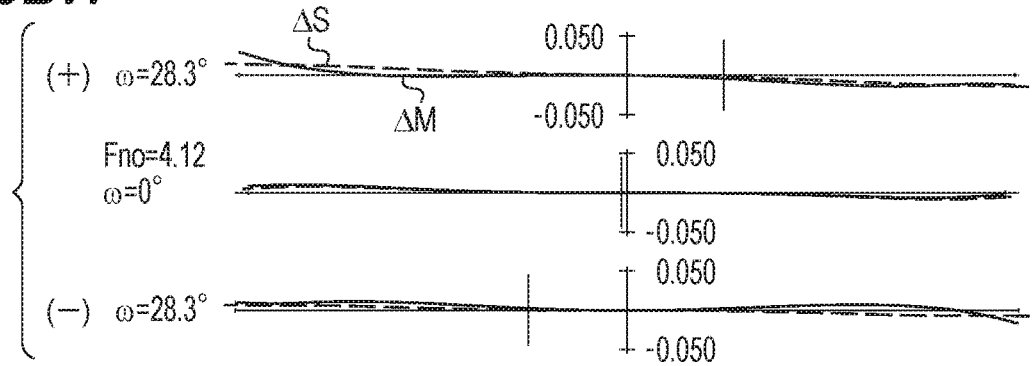
FIG. 9BW is a lateral aberration diagram at a wide-angle end of the zoom lens of Embodiment 3 after image position displacement of 0.3 degrees.
Figure 9B:
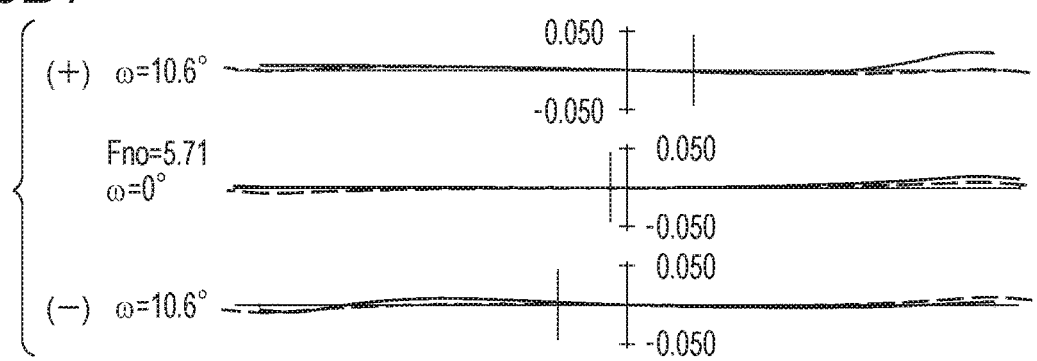

FIGS. 7A, 7B, and 7C are lens cross-sectional views of a zoom lens of Embodiment 3 of the present invention at the wide-angle end, middle zoom position, and telephoto end, respectively. FIGS. 8A, 8B, and 8C are aberration diagrams of the zoom lens of Embodiment 3 at the wide-angle end, middle zoom position, and telephoto end, respectively. FIGS. 9AW and 9AT are lateral aberration diagrams of the zoom lens of Embodiment 3 at the wide-angle end and telephoto end, respectively. FIGS. 9BW and 9BT are lateral aberration diagrams of the zoom lens of Embodiment 3 after 0.3 degree-image stabilization at the wide-angle end and telephoto end, respectively. The zoom lens of Embodiment 3 has a zoom ratio of 2.88 and an aperture ratio of about 4.12 to 5.7.

Figure 11B:
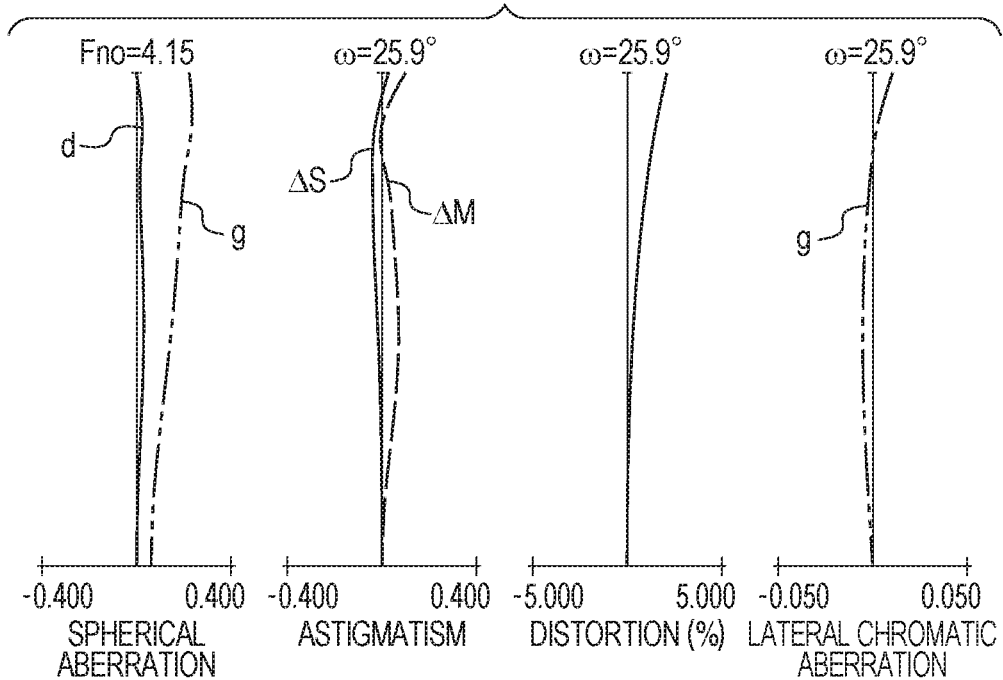
FIG. 11B is an aberration diagram at the middle zoom position of Embodiment 4.
Figure 11C:
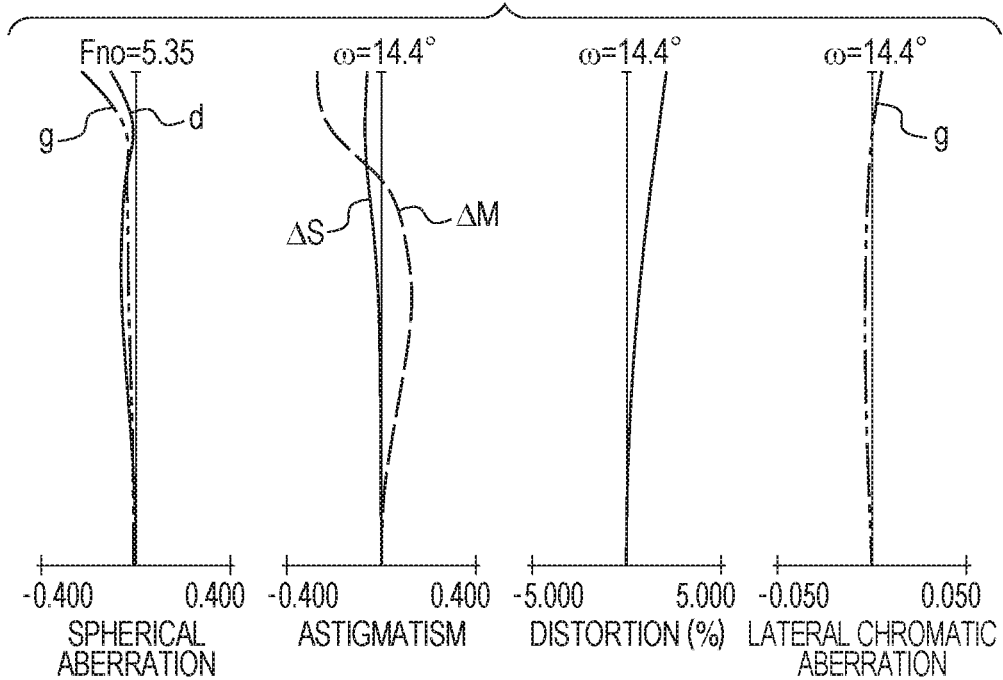
FIG. 11C is an aberration diagram at the telephoto end of Embodiment 4.
Figure 12A:
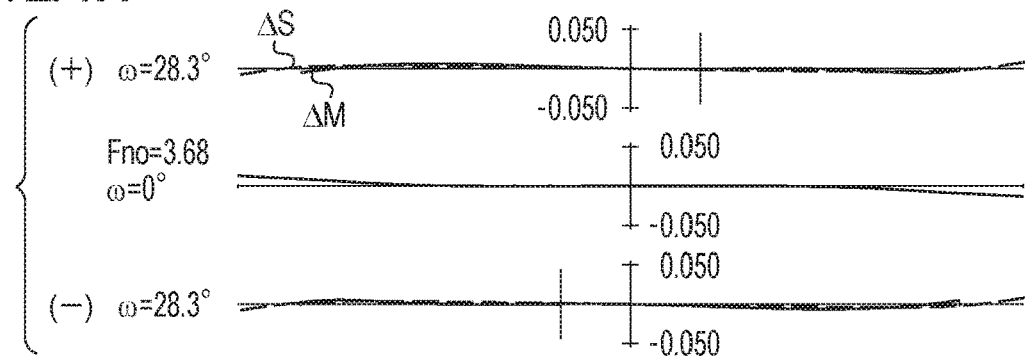
FIG. 12AW is a lateral aberration diagram at the wide-angle end of the zoom lens of Embodiment 4 before image position displacement of 0.3 degrees.
Figure 12A:
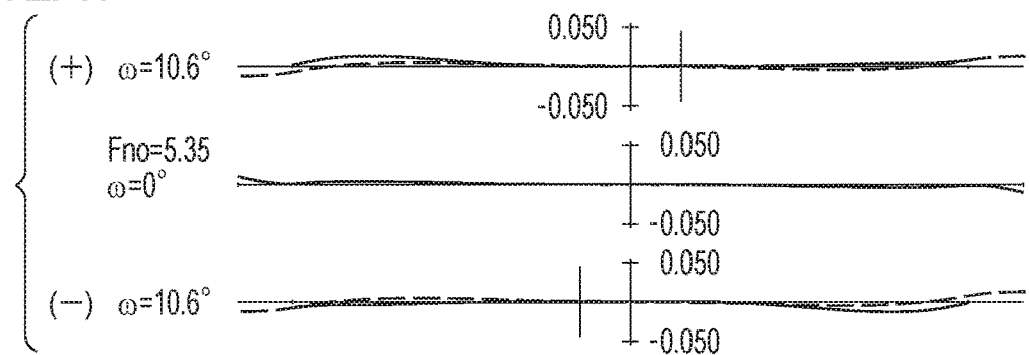
Figure 12B:
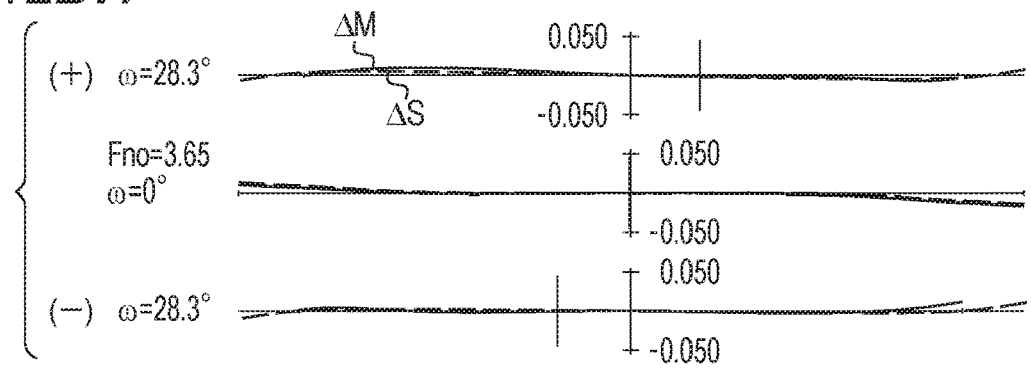
FIG. 12BW is a lateral aberration diagram at a wide-angle end of the zoom lens of Embodiment 4 after image position displacement of 0.3 degrees.
Figure 12B:
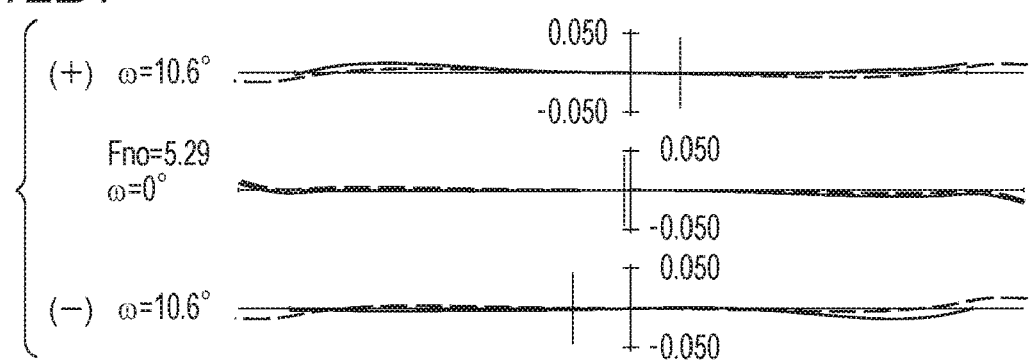

FIGS. 10A, 10B, and 10C are lens cross-sectional views of a zoom lens of Embodiment 4 of the present invention at the wide-angle end, middle zoom position, and telephoto end, respectively. FIGS. 11A, 11B, and 11C are aberration diagrams of the zoom lens of Embodiment 4 at the wide-angle end, middle zoom position, and telephoto end, respectively. FIGS. 12AW and 12AT are lateral aberration diagrams of the zoom lens of Embodiment 4 at the wide-angle end and telephoto end, respectively. FIGS. 12BW and 12BT are lateral aberration diagrams of the zoom lens of Embodiment 4 after 0.3 degree-image stabilization at the wide-angle end and telephoto end, respectively. The zoom lens of Embodiment 4 has a zoom ratio of 2.87 and an aperture ratio of about 3.64 to 5.29.

Figure 13A:
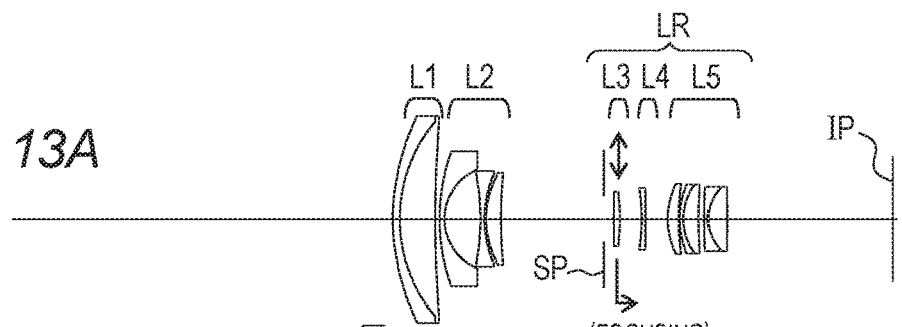
FIG. 13A is a lens cross-sectional view at a wide-angle end of Embodiment 5.
Figure 13B:
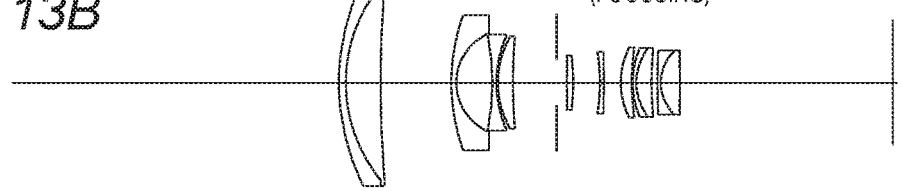
FIG. 13B is a lens cross-sectional view at a middle zoom position of Embodiment 5.
Figure 13C:
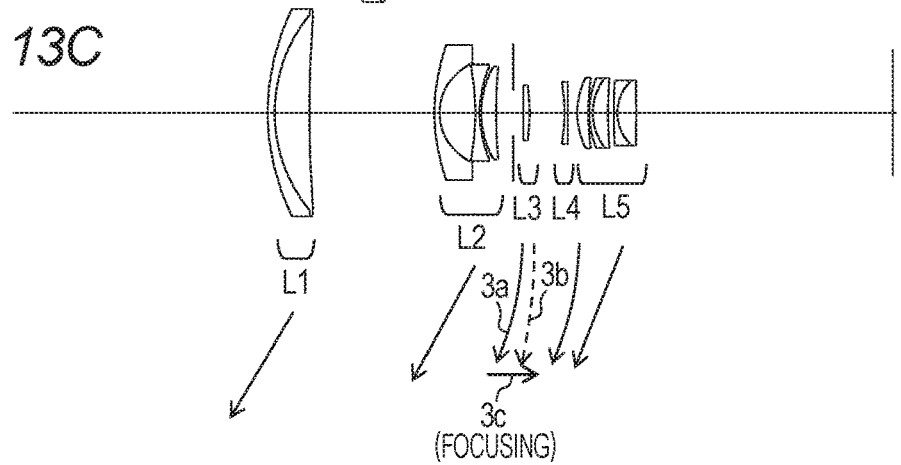
FIG. 13C is a lens cross-sectional view at a telephoto end of Embodiment 5.
Figure 14A:
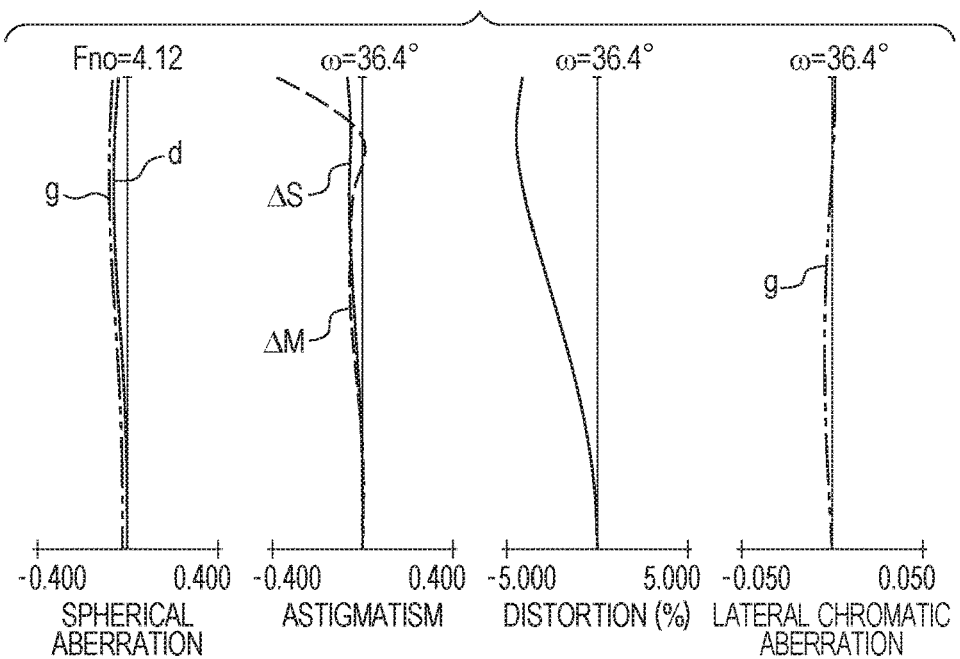
FIG. 14A is an aberration diagram at the wide-angle end of Embodiment 5.
Figure 14B:
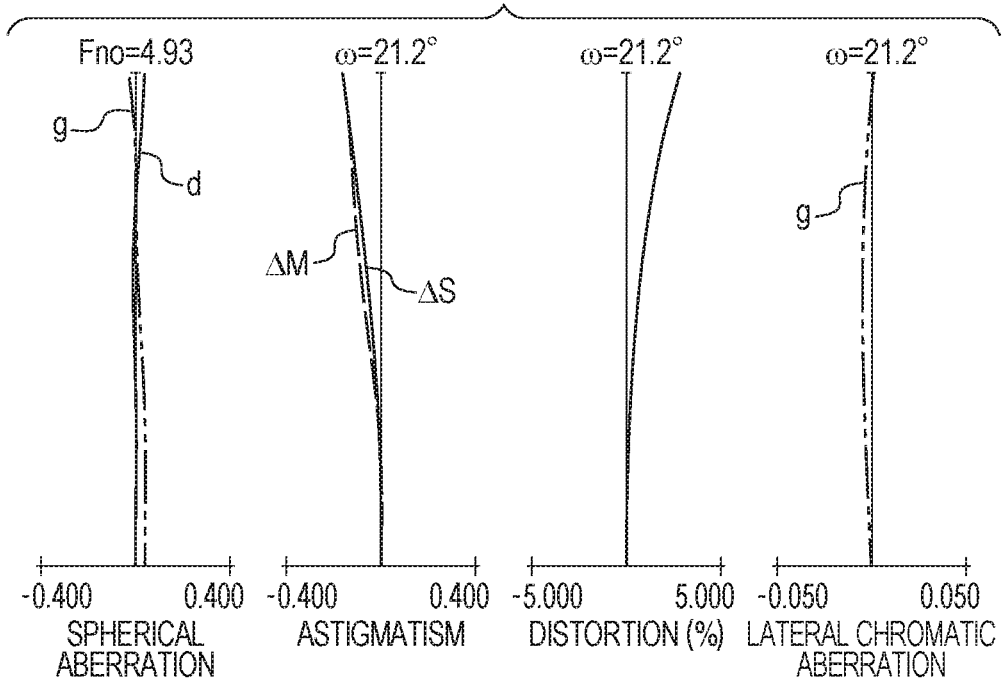
FIG. 14B is an aberration diagram at the middle zoom position of Embodiment 5.
Figure 14C:
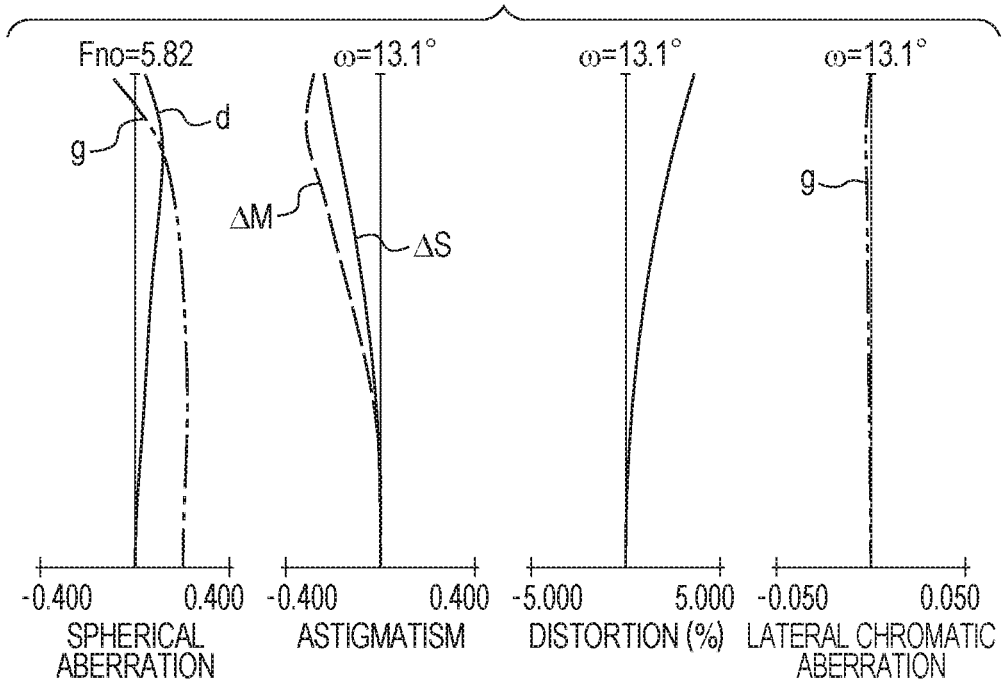
FIG. 14C is an aberration diagram at the telephoto end of Embodiment 5.
Figure 15A:
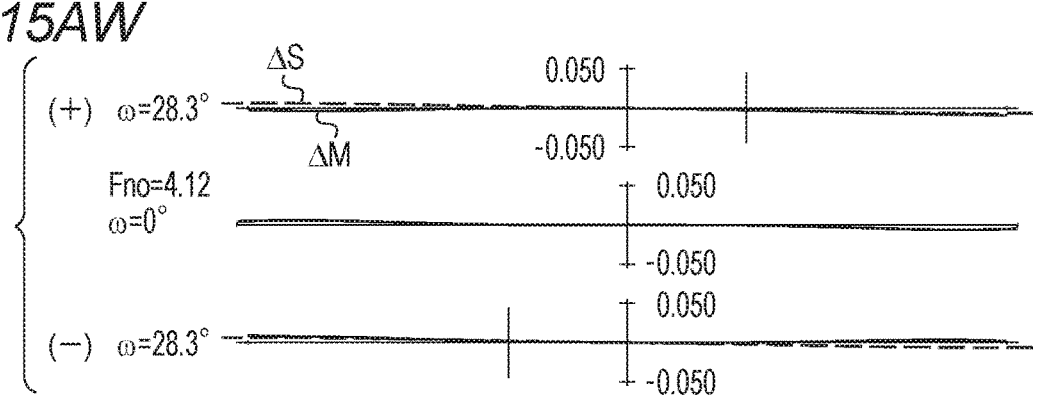
FIG. 15AW is a lateral aberration diagram at the wide-angle end of the zoom lens of Embodiment 5 before image position displacement of 0.3 degrees.
Figure 15A:
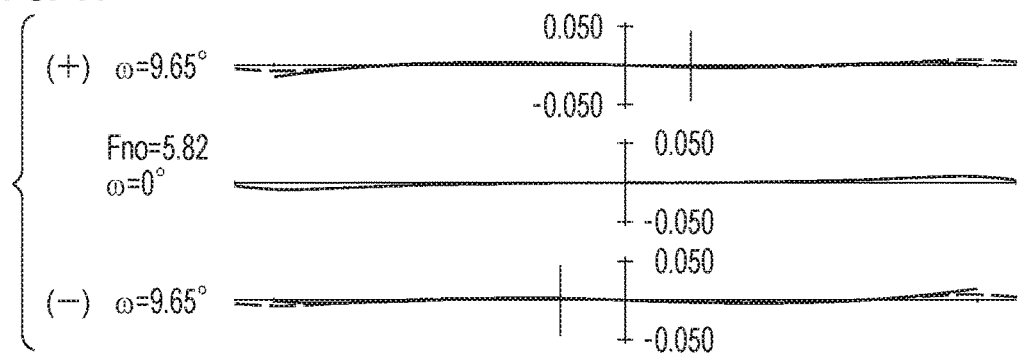
Figure 15B:
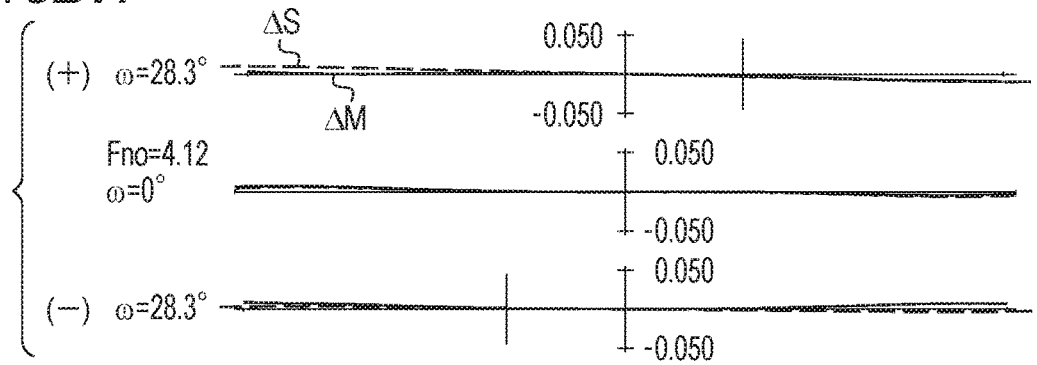
FIG. 15BW is a lateral aberration diagram at a wide-angle end of the zoom lens of Embodiment 5 after image position displacement of 0.3 degrees.
Figure 15B:
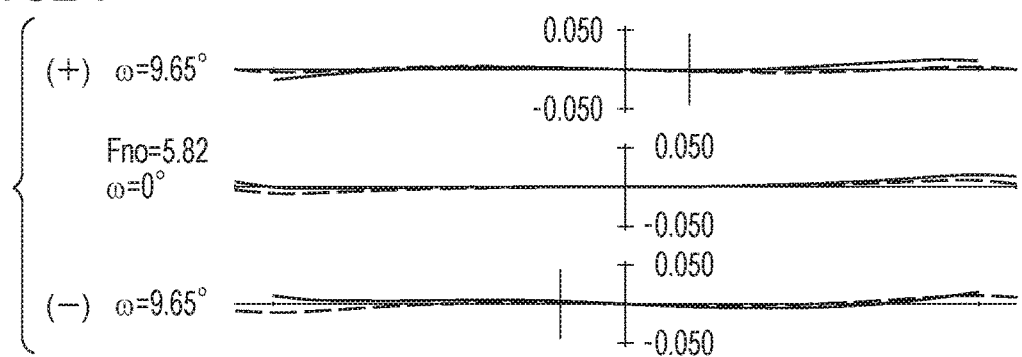

FIGS. 13A, 13B, and 13C are lens cross-sectional views of a zoom lens of Embodiment 5 of the present invention at the wide-angle end, middle zoom position, and telephoto end, respectively. FIGS. 14A, 14B, and 14C are aberration diagrams of the zoom lens of Embodiment 5 at the wide-angle end, middle zoom position, and telephoto end, respectively. FIGS. 15AW and 15AT are lateral aberration diagrams of the zoom lens of Embodiment 5 at the wide-angle end and telephoto end, respectively. FIGS. 15BW and 15BT are lateral aberration diagrams of the zoom lens of Embodiment 5 after 0.3 degree-image stabilization at the wide-angle end and telephoto end, respectively. The zoom lens of Embodiment 5 has a zoom ratio of 3.17 and an aperture ratio of about 4.12 to 5.82.

The zoom lens of each embodiment is an image pickup optical system used in an image pickup apparatus, such as a video camera, a digital still camera, a silver-halide film camera, or a TV camera. The zoom lens of each embodiment can be used as a projection optical system for a projection apparatus (a projector). The left side in the lens cross-sectional views corresponds to the object side (the front side) while the right side corresponds to the image side (the rear side). In the lens cross-sectional views, i indicates the number of lens units arranged on the object side of the lens unit of interest. Li indicates an i-th lens unit. L1 indicates a first lens unit having a positive refractive power while L2 indicates a second lens unit having a negative refractive power.

LR indicates a rear lens group which includes at least one lens unit having a positive refractive power and has a positive refractive power as a whole. SP indicates an aperture stop having a maximum aperture F-number (Fno) and determines (limits) a light flux. FP indicates a flare cut stop to cut unnecessary light. IP indicates an image plane. When the zoom lens of each embodiment is used as the image pickup optical system of a video camera or digital still camera, the image pickup plane of a solid-state image sensing device (a photoelectric conversion element) such as a CCD sensor or a CMOS sensor is placed at the image plane IP. When the zoom lens of each embodiment is used as the image pickup optical system of a silver-halide film camera, the photosensitive plane corresponding to the film plane is placed.

Arrows indicate movement loci of the respective lens units at zooming from the wide-angle end to the telephoto end. Each arrow relating to focusing indicates the direction of movement of the lens unit at focusing from infinity to a close distance.

In each embodiment, the rear lens group LR includes in order from the object side to the image side: a third lens unit L3 having a positive refractive power; a fourth lens unit L4 having a positive refractive power; and a fifth lens unit L5 having a positive refractive power. The third lens unit L3 is composed of one positive lens, which is the lens P1 for image stabilization. Moreover, the rear lens group LR includes in order from the object side to the image side: a third lens unit L3 having a positive refractive power; a fourth lens unit L4 having a negative refractive power; and a fifth lens unit L5 having a positive refractive power. The third lens unit L3 is composed of one positive lens, which is a lens P1 for image stabilization.

Moreover, the rear lens group LR includes in order from the object side to the image side: a third lens unit L3 having a positive refractive power; a fourth lens unit L4 having a negative refractive power; and a fifth lens unit L5 having a positive refractive power. The third lens unit L3 is composed of a plurality of lenses including a positive lens P1 located closest to the object. The positive lens P1 is the lens for image stabilization.

In Embodiment 1 of FIGS. 1A, 1B, and 1C, L1 indicates the first lens unit having a positive refractive power; L2, the second lens unit having a negative refractive power; L3, the third lens unit having a positive refractive power; L4, the fourth lens unit having a positive refractive power; and L5, the fifth lens unit having a positive refractive power. The rear lens group LR is composed of the third, fourth, and fifth lens units L3, L4, and L5.

In the zoom lens of Embodiment 1, at zooming from the wide-angle end to the telephoto end, the first lens unit L1 monotonically moves toward the object side. The second lens unit L2 to fifth lens unit L5 move toward the object side so that the distance between the first and second lens units L1 and L2 at the telephoto end is longer than that at the wide-angle end while the distance between the second and third lens units L2 and L3 is shorter. In Embodiment 1, at image stabilization, the third lens unit L3 moves so as to have a component perpendicular to the optical axis. The third lens unit L3 is the lens P1 for image stabilization composed of a single lens and is configured to correct the image position.

In Embodiment 1, the third lens unit L3 moves on the optical axis for focusing. Solid curve 3a of the third lens unit L3 indicates the locus of movement to correct a change in image plane during zooming from the wide-angle end to the zoom position at the telephoto end when the zoom lens is focused on infinity. Dotted curve 3b of the third lens unit L3 indicates the locus of movement to correct a change in image plane during zooming from the wide-angle end to the zoom position at the telephoto end when the zoom lens is focused on a close distance. In the process of focusing from infinity to a close distance at the zoom position of the telephoto end, the third lens unit L3 is retracted rearward as indicated by arrow 3c.

In Embodiment 2 of FIGS. 4A, 4B, and 4C and Embodiment 3 of FIGS. 7A, 7B, and 7C, L1 indicates a first lens unit having a positive refractive power; L2, a second lens unit having a negative refractive power; L3, a third lens unit having a positive refractive power; L4, a fourth lens unit having a negative refractive power; and L5, a fifth lens unit having a positive refractive power. The rear lens group LR is composed of the third, fourth, and fifth lens units L3, L4, and L5.

In the zoom lenses of Embodiments 2 and 3, at zooming from the wide-angle end to the telephoto end, the first lens unit L1 monotonically moves toward the object side. The second lens unit L2 to fifth lens unit L5 move toward the object side, so that the distance between the first and second lens units L1 and L2 at the telephoto end is longer than that at the wide-angle end while the distance between the second and third lens units L2 and L3 is shorter. In Embodiments 2 and 3, at image stabilization, the third lens unit L3 moves so as to have a component perpendicular to the optical axis. The third lens unit L3 is the lens P1 for image stabilization composed of a single lens.

In Embodiments 2 and 3, the fourth lens unit L4 is moved on the optical axis for focusing. Solid curve 4a of the fourth lens unit L4 indicates the locus of movement to correct a change in image plane at zooming from the wide-angle end to the zoom position of the telephoto end when the zoom lens is focused on infinity. Dotted curve 4b of the fourth lens unit L4 indicates the locus of movement to correct a change in image plane at zooming from the wide-angle end to the zoom position at the telephoto end when the zoom lens is focused on a close distance. In the process of focusing from infinity to a close distance at the zoom position of the telephoto end, the fourth lens unit L4 is advanced forward as indicated by arrow 4c.

In Embodiment 4 of FIGS. 10A, 10B, and 10C, L1 indicates a first lens unit having a positive refractive power; L2, a second lens unit having a negative refractive power; L3, a third lens unit having a positive refractive power; L4, a fourth lens unit having a negative refractive power; and L5, a fifth lens unit having a positive refractive power. The rear lens group LR is composed of the third, fourth, and fifth lens units L3, L4, and L5.

In the zoom lens of Embodiment 4, at zooming from the wide-angle end to the telephoto end, the first lens unit L1 monotonically moves toward the object side. The second lens unit L2 to fifth lens unit L5 move toward the object side so that the distance between the first and second lens units L1 and L2 at the telephoto end is longer than that at the wide-angle end; the distance between the second and third lens units L2 and L3 is shorter; the distance between the third and fourth lens units L3 and L4 is shorter; and the distance between the fourth and fifth lens units L4 and L5 is longer.

In Embodiment 4, at image stabilization, the positive lens P1 closest to the object in the third lens unit L3 moves so as to have a component perpendicular to the optical axis. In Embodiment 4, the fourth lens unit L4 of the fourth lens unit L4 is moved on the optical axis for focusing. Solid curve 4a of the fourth lens unit L4 indicates the locus of movement to correct a change in image plane at zooming from the wide-angle end to the zoom position of the telephoto end when the zoom lens is focused on infinity. Dotted curve 4b of the fourth lens unit L4 indicates the locus of movement to correct a change in image plane at zooming from the wide-angle end to the zoom position of the telephoto end when the zoom lens is focused on a close distance. In the process of focusing from infinity to a close distance at the zoom position of the telephoto end, the fourth lens unit L4 is retracted rearward as indicated by arrow 4c.

In Embodiment 5 of FIGS. 13A, 13B, and 13C, L1 indicates a first lens unit having a positive refractive power; L2, a second lens unit having a negative refractive power; L3, a third lens unit having a positive refractive power; L4, a fourth lens unit having a negative refractive power; and L5, a fifth lens unit having a positive refractive power. The rear lens group LR is composed of the third, fourth, and fifth lens units L3, L4, and L5.

In the zoom lens of Embodiment 5, at zooming from the wide-angle end to the telephoto end, the first lens unit L1 monotonically moves toward the object side. The second lens unit L2 to fifth lens unit L5 move toward the object side so that the distance between the first and second lens units L1 and L2 at the telephoto end is longer than that at the wide-angle end and the distance between the second and third lens units L2 and L3 is shorter. In Embodiment 5, at image stabilization, the third lens unit L3 moves so as to have a component perpendicular to the optical axis. The third lens unit L3 is the positive lens P1 for image stabilization which is composed of a single lens. The focusing process in Embodiment 5 is the same as that in Embodiment 1.

In the aberration diagrams, Fno is the F-number, and ω is a half angle of view (degree), which is calculated by optical ray tracing. In the spherical aberration diagrams, d indicates aberration for the d-line (wavelength: 587.56 nm), and g indicates aberration for the g-line (wavelength: 435.835 nm).

In the astigmatism diagrams, ΔS indicates astigmatism for the d-line in the sagittal plane, and ΔM indicates astigmatism for the d-line in the meridional image plane. The distortion is illustrated for the d-line. In the lateral chromatic aberration diagrams, g indicates aberration for the g-line. In the lateral aberration diagrams, curves at the top to bottom in each diagram correspond to image heights of 10, 0, and −10 mm, respectively. ΔS indicates aberration for the d-line in the sagittal cross section, and ΔM indicates aberration for the d-line in the meridional cross section.

In each embodiment, the wide-angle end and telephoto end refer to zoom positions where the lens unit to change the magnification is located at both ends of a mechanically movable range on the optical axis.

The zoom lens of the present invention includes in order from the object side to the image side: the first lens unit L1 having a positive refractive power; the second lens unit L2 having a negative refractive power; and the rear lens group LR which includes at least one lens unit and has a positive refractive power as a whole. The distances between the adjacent lens units change during zooming. The rear lens group LR includes the lens P1 which has a positive refractive power and moves so as to have a component perpendicular to the optical axis at image stabilization.

The lens P1 has a shape factor SFP1 that satisfies the conditional expression (1):

$$-2.5 < SFP1 < -0.5 \qquad (1).$$

The shape factor SFP1 is expressed by:

$$SFP1 = (R2P1 + R1P1)/(R2P1 - R1P1)$$

where R1P1 is the curvature radius of the lens surface of the lens P1 on the object side and R2P1 is the curvature radius of the lens surface of the lens P1 on the image side (when the lens surfaces are aspherical, the curvature radius thereof is a paraxial curvature radius (the radius of a referential quadric surface).

In order to shorten the total lens length at the wide-angle end while successfully correcting various aberrations throughout the entire zoom range, the zoom lens has a lens configuration composed, in order from the object side to the image side, of the first lens unit L1 having a positive refractive power; the second lens unit L2 having a negative refractive power; and the rear lens group LR having a positive refractive power as a whole. The configuration including at least three lens units allows for effective correction of various aberrations, such as spherical aberration and coma caused by the first and second lens units L1 and L2.

In order to implement downsize of the zoom lens and high zoom ratio, zooming is performed by changing the distances between the lens units so that the distance between the first and second lens units L1 and L2 at the telephoto end is longer than that at the wide-angle end and the distance between the second and third lens units L2 and L3 is shorter. The rear lens group LR having a positive refractive power as a whole is provided with the aperture stop SP, and the lens P1 having a positive refractive power is provided adjacent to the aperture stop SP. The lens P1 having a positive refractive power (the correction lens unit) is moved so as to have a component perpendicular to the optical axis for image stabilization. This allows for correction of large image blur with small movement of the lens P1.

The conditional expression (1) defines the shape factor of the lens P1 to reduce decentration aberration mainly caused by image stabilization and maintain good optical performances. When the shape factor SFP1 is greater than the upper limit of the conditional expression (1) and the lens P1 is decentered, it is difficult to secure a high imaging performance due to large decentration partial blur although decentration coma can be corrected successfully, which is not preferred. When the shape factor SFP1 is less than the lower limit in the conditional expression (1), the decentration partial blur and decentration astigmatism can be corrected successfully, but decentration coma is hardly reduced. It is therefore difficult to downsize the zoom lens while securing the amount of movement required to shift the image by a predetermined amount for image stabilization.

In order to reduce the size and weight of the correction lens for image stabilization and reduce the number of lenses of the zoom lens, image stabilization is performed by using the lens P1 having a positive refractive power in the rear lens group LR. Moreover, in order to minimize the lens configuration of the correction lens for image stabilization, the correction lens is composed of the one lens P1 having a positive refractive power.

In each embodiment, the numerical range of the conditional expression (1) is preferably set as follows:

$$-2.1 < SFP1 < -0.6 \tag{1a}$$

By satisfying the conditional expression (1a), the sensitivity of the lens P1 to decentration coma at the wide-angle end can be reduced, facilitating securing a high imaging performance. Moreover, the numerical range of the conditional expression (1a) is more preferably set as follows:

$$-1.6 < SFP1 < -0.7 \tag{1b}$$

By employing the lens units having an appropriate configuration and satisfying the conditional expression (1) as described above, the zoom lens can be downsized, and the zoom lens has a high zoom ratio and provides a high imaging performance throughout the entire zoom range. Moreover, the lens P1 for image stabilization can be easily reduced in size and weight.

In each embodiment, it is still more preferable that the zoom lens satisfies at least one of the following conditional expressions:

$$0.01 < \beta st/\beta sw < 3.20 \tag{2}$$

$$1.8 < D23w/D23t < 20.0 \tag{3}$$

$$1.0 < |1-\beta Pw| < 25.0 \tag{4}$$

$$1.1 < fP/fRt < 4.8 \tag{5}$$

$$0.7 < fRt/fw < 2.0 \tag{6}$$

$$0.5 < (1-\beta Pt) \times \beta Rt < 1.8 \tag{7}$$

$$1.45 < nP < 1.75 \tag{8; and}$$

$$45.0 < \nu P < 100.0 \tag{9}$$

In the above conditional expressions, βsw is a lateral magnification of a composite system of the second lens unit L2 to the lens P1 at the wide-angle end, and βst is a lateral magnification of the composite system of the second lens unit L2 to the lens P1 at the telephoto end. D23w is a distance on the optical axis between the second and third lens units L2 and L3 at the wide-angle end, and D23t is a distance on the optical axis between the second and third lens units L2 and L3 at the telephoto end.

βPw is a lateral magnification of the lens P1 at the wide-angle end. fP is the focal length of the lens P1, and fRt is the focal length of the rear lens group LR at the telephoto end. fw is the focal length of the zoom lens at the wide-angle end. βPt is a lateral magnification of the lens P1 at the telephoto end, and βRt is a lateral magnification of the optical system provided on the image side of the lens P1 at the telephoto end. nP and νP are the refractive power and Abbe number of the material of the lens P1 for the d-line, respectively.

The Abbe number νd of the material is defined as follows:

$$\nu d = (Nd-1)/(NF-NC),$$

where Nd, NF, and NC are refractive powers for the d-line, F-line, and C-line of the Fraunhofer lines, respectively.

Next, a description is given of the technical meaning of each of the aforementioned conditional expressions. The conditional expression (2) relates to variations in lateral magnification at zooming in the composite system of the second lens unit L2 to the lens P1. The conditional expression (2) is to optimize the magnification changing effect of the second lens unit L2 and maintain good optical performances at image stabilization by the lens P1. When βst/βsw is greater than the upper limit in the conditional expression (2), the magnification changing effect of the second lens unit L2 at the telephoto end is increased, so that it is easy to obtain the magnification changing effect at the telephoto end. However, it is difficult to maintain good optical performances at image stabilization and especially reduce decentration coma, which is not preferred.

When βst/βsw is less than the lower limit in the conditional expression (2), it is difficult to obtain a desired zoom ratio of the zoom lens. Alternatively, other lens units are configured to be responsible for a large magnification changing effect. This increases the total lens length at the telephoto end, making it difficult to downsize the zoom lens.

The conditional expression (3) defines an appropriate range of a ratio of air space between the second and third lens units L2 and L3 on the optical axis at the telephoto end to that at the wide-angle end. When the ratio is less than the lower limit in the conditional expression (3), the total lens length is increased at the telephoto end, and the front lens effective diameter is increased. Moreover, spherical aberration is not corrected sufficiently at the telephoto end, which is not preferred.

Furthermore, the magnification changing effect of the rear lens group LR at zooming is increased. This increases the sensitivity of spherical aberration and coma to manufacturing error of the rear lens group LR, thus making it difficult to implement a high zoom ratio. When the ratio exceeds the upper limit in the conditional expression (3), it is difficult to equalize the aberration correction effect of each lens unit at zooming, and it is difficult to reduce variations in field curvature at zooming. Moreover, the field curvature is increased to the negative side in the telephoto side, and in the wide-angle side, considerable flare could be produced due to light fluxes below the principal ray, which is not preferred.

The conditional expression (4) defines the lateral magnification of the lens P1 for image stabilization at the wide-angle end. In the case where $|1-\beta Pw|$ is greater than the upper limit in the conditional expression (4), the image is shifted by a small amount when the lens P1 is decentered by a predetermined amount so as to have a component perpendicular to the optical axis. Accordingly, the lens needs to be moved by a large amount in order to correct image displacement for image blurring, making it difficult to downsize the zoom lens. In the case where $|1-\beta Pw|$ is less than the lower limit in the conditional expression (4), the decentration sensitivity of the lens P1 is increased. When the lens P1 is decentered by a predetermined amount so as to have a component perpendicular to the optical axis, decentration field curvature is therefore increased, which is not preferred.

The conditional expression (5) defines the focal length of the lens P1 which is moved so as to have a component perpendicular to the optical axis for image stabilization based on the focal length of the rear lens group LR at the telephoto end. The conditional expression (5) is to successfully correct various aberrations due to image stabilization, especially decentration coma in the telephoto side. Moreover, the conditional expression (5) is to facilitate reduction of the lens effective diameter of the rear lens group LR through the light flux convergence of the lens P1.

When fP/fRt is greater than the upper limit in the conditional expression (5), the low positive refractive power of the lens P1 reduces image shift sensitivity TS, so that the amount of displacement of the lens P1 at image stabilization is increased, which is not preferred.

Herein, the image shift sensitivity TS refers to the ratio of perpendicular displacement $\Delta L$ of a shift lens when the shift lens is moved in the direction perpendicular to the optical axis to displacement $\Delta I$ of an image (an imaging position) perpendicular to the optical axis on the image plane:

$$TS=\Delta I/\Delta L.$$

When fP/fRt is less than the lower limit in the conditional expression (5), the excessively high positive refractive power of the lens P1 makes it difficult to secure backfocus of a predetermined length, which is not preferred.

The conditional expression (6) defines the ratio of the focal length of the rear lens group LR at the telephoto end to the focal length of the zoom lens at the wide-angle end. The conditional expression (6) is mainly to successfully correct various aberrations, such as spherical aberration and coma, while shortening the total lens length at the wide-angle end. When fRt/fw is greater than the upper limit in the conditional expression (6), the positive refractive power of the rear lens group LR is excessively low, so that displacements of lens units necessary for changing the magnification in the rear lens group LR are increased, which is not preferred. Moreover, the total lens length at the wide-angle end tends to be increased, which is not preferred. When fRt/fw is less than the lower limit in the conditional expression (6), the excessively high positive refractive power of the rear lens group LR makes it difficult to correct spherical aberration, coma, astigmatism, and the like in a balanced manner.

The conditional expression (7) defines the image shift sensitivity at image stabilization of the lens P1. When $(1-\beta Pt)\times\beta Rt$ is greater than the upper limit in the conditional expression (7), the displacement of the lens P1 necessary to shift the image by a predetermined amount is increased, so that it is difficult to downsize the zoom lens. Moreover, it is difficult to reduce variations in aberration when the lens P1 is moved in order to shift the image by a predetermined amount. When $(1-\beta Pt)\times\beta Rt$ is less than the lower limit in the conditional expression (7), the image is shifted by a large amount with very small movement of the lens unit P1. It is therefore necessary to control image displacement with a high level of accuracy, which is not preferred.

The conditional expressions (8) and (9) define the material constituting the lens P1. The conditional expressions (8) and (9) are to mainly reduce the occurrence of axial chromatic aberration at the wide-angle end while reducing the occurrence of chromatic aberration when the lens P1 is decentered. When the refractive index and Abbe number of the material of the lens P1 are within the ranges of the conditional expressions (8) and (9), the field curvature and decentering chromatic curvature are easily corrected at image stabilization.

It is desirable in each embodiment that the rear lens group LR includes at least one aspherical surface. The rear lens group LR desirably includes at least one aspherical surface in order to effectively correct field curvature at the wide-angle end while downsizing the zoom lens.

According to the present invention, as described above, it is possible to easily obtain a zoom lens which is short in total lens length at the wide-angle end, easily performs image stabilization with a simple configuration, successfully corrects various aberrations, such as spherical aberration, coma, and field curvature, and therefore provides high optical performances. More preferably, the numerical ranges of the conditional expressions (2) to (9) are set as follows:

$$0.1<\beta st/\beta sw<2.5 \tag{2a}$$

$$2.4<D23w/D23t<18.0 \tag{3a}$$

$$1.3<|-\beta Pw|<22.0 \tag{4a}$$

$$1.25<fP/fRt<4.00 \tag{5a}$$

$$1.0<fRt/fw<1.8 \tag{6a}$$

$$0.6<(1-\beta Pt)\times\beta Rt<1.7 \tag{7a}$$

$$1.47<nP<1.70 \tag{8a); and}$$

$$50.0<\nu P<85.0 \tag{9a}.$$

Satisfying the conditional expression (2a) further optimizes the magnification changing effect of the second lens unit L2, so that correction of field curvature is easily implemented when the angle of view is increased. Satisfying the conditional expression (3a) further optimizes the distances between the second and third lens units L2 and L3 at the wide-angle end and telephoto end, facilitating reduction of the front lens effective diameter. Satisfying the conditional expression (4a) optimizes the image shift sensitivity of the lens P1 while easily reducing deterioration in image quality at image stabilization.

Satisfying the conditional expression (5a) allows for shortening of the total lens length at the wide-angle end while facilitating optimization of the shift sensitivity of the lens P1. Satisfying the conditional expression (6a) secures long enough backfocus at the wide-angle end while facilitating an increase in angle of view. Moreover, it becomes easy to further reduce variations in field curvature due to focusing throughout the entire zoom range.

Satisfying the conditional expression (7a) optimizes the image shift sensitivity of the lens P1 at the telephoto end and facilitates reduction in size and weight of the lens P1. Satisfying the conditional expressions (8a) and (9a) facilitates further reducing variations in axial chromatic aberration and variations in lateral chromatic aberration and image curvature at image stabilization. Still More preferably, the numerical ranges of the conditional expressions (2a) to (9a) are set as follows:

$$0.2 < \beta st/\beta sw < 2.3 \quad (2b);$$

$$3.0 < D23t/D23w < 17.0 \quad (3b);$$

$$1.58 < |1-\beta Pw| < 20.00 \quad (4b);$$

$$1.5 < fP/fRt < 3.4 \quad (5b);$$

$$1.3 < fRt/fw < 1.6 \quad (6b);$$

$$0.7 < (1-\beta Pt) \times \beta Rt < 1.4 \quad (7b);$$

$$1.48 < nP < 1.65 \quad (8b); \text{ and}$$

$$58.0 < vP < 72.0 \quad (9b).$$

Figure 16:
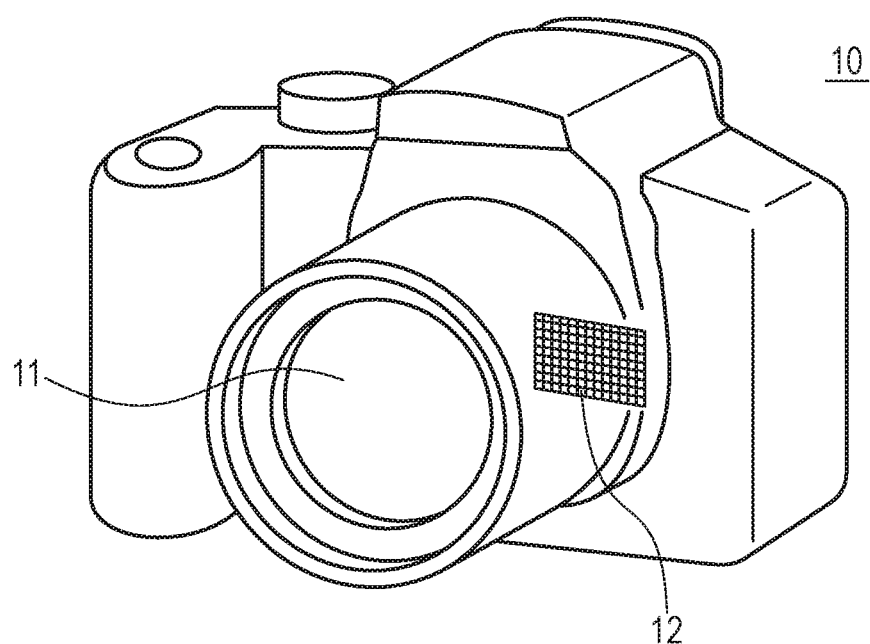
FIG. 16 is a schematic diagram of main parts of an image pickup apparatus.

Next, a description is given of an embodiment of a digital still camera using a zoom lens of the present invention as an image pickup optical system with reference to FIG. 16. In FIG. 16, reference numeral 10 denotes a camera body, and reference numeral 11 denotes an image pickup optical system composed of any one of the zoom lenses described in Embodiments 1 to 5. Reference numeral 12 denotes a solid-state image sensing element (a photoelectric conversion element), such as a CCD sensor or a CMOS sensor, which is incorporated in the camera body and is configured to receive an object image formed by the image pickup system 11.

Hereinafter, specific numerical data corresponding to Embodiments 1 to 5 are shown. In the numerical data, i indicates a surface number located between the object and the surface of interest. ri indicates a curvature radius of the i-th optical surface (the i-th surface). di indicates an on-axis distance between the i-th and (i+1)-th surfaces. ndi and vdi are the refractive index and Abbe number of the material of the optical member between the i-th and (i+1)-th surfaces for the d line. Aspherical shapes are expressed by:

$$X = \frac{\frac{H^2}{R}}{1 + \sqrt{1-(1+K)\left(\frac{H}{R}\right)^2}} + A4H^4 + A6H^6 + A8H^8 + A10H^{10} + A12H^{12}$$

where the X axis corresponds to the optical axis direction, the H axis corresponds to the direction perpendicular to the optical axis, the light travel direction is set to positive, R is a paraxial curvature radius, K is a conic constant, and A4, A6, A8, A10, and A12 are aspheric coefficients. * denotes a surface having an aspheric profile. "e-x" means "×10$^{-x}$". BF means backfocus, indicating the distance between the last lens surface and image plane. The total lens length is a sum of the distance between the first lens surface and the last lens surface and the backfocus distance. "Wide" indicates the wide-angle end, "Middle" indicates the middle zoom position, and "Telephoto" indicates the telephoto end. Table 1 shows the relationship between parameters concerning the aforementioned conditional expressions and numerical examples corresponding to each conditional expression.

[Numerical Data 1]

| [unit: mm] | | | | |
|---|---|---|---|---|
| Surface data | | | | |
| Surface number | r | d | nd | vd |
| 1 | 62.156 | 1.80 | 1.90366 | 31.3 |
| 2 | 36.268 | 7.54 | 1.71300 | 53.9 |
| 3 | −4672.434 | (variable) | | |
| 4 | 59.690 | 1.20 | 1.83481 | 42.7 |
| 5 | 11.796 | 6.97 | | |
| 6* | −30.926 | 1.10 | 1.55332 | 71.7 |
| 7 | 26.683 | 0.30 | | |
| 8 | 22.131 | 3.21 | 1.85478 | 24.8 |
| 9 | 130.703 | (variable) | | |
| 10 | 330.831 | 1.90 | 1.48749 | 70.2 |
| 11 | −41.976 | (variable) | | |
| 12(stop) | ∞ | 2.00 | | |
| 13* | 12.178 | 5.65 | 1.55332 | 71.7 |
| 14 | −32.945 | 0.55 | | |
| 15 | −44.850 | 1.00 | 1.91082 | 35.3 |
| 16 | 27.804 | 3.05 | | |
| 17 | −306.745 | 2.07 | 1.59551 | 39.2 |
| 18 | −24.487 | 0.75 | 1.83481 | 42.7 |
| 19 | 102.330 | (variable) | | |
| 20 | 25.065 | 2.34 | 1.58313 | 59.4 |
| 21* | −51.815 | (variable) | | |
| Image plane | ∞ | | | |

Aspheric surface data

6th surface

K = 0.00000e+000
A4 = 4.75383e−006
A6 = −2.99582e−008
A8 = −3.56889e−010

13th surface

K = 0.00000e+000
A4 = −1.72486e−005
A6 = −3.11927e−009
A8 = −1.97961e−009

21st surface

K = 0.00000e+000
A4 = 9.34164e−005
A6 = 2.72542e−007
A8 = 1.85157e−009

Various data
Zoom ratio 3.34

| | Wide angle | Middle | Telephoto |
|---|---|---|---|
| Focal length | 17.52 | 35.37 | 58.59 |
| F-number | 3.30 | 4.63 | 5.50 |
| Half angle of view (deg) | 29.71 | 15.79 | 9.69 |
| Image height | 10.00 | 10.00 | 10.00 |
| Total lens length | 107.58 | 123.02 | 144.65 |

-continued

[unit: mm]

| | | | |
|---|---|---|---|
| BF | 35.15 | 52.16 | 63.16 |
| d3 | 1.00 | 13.15 | 29.09 |
| d9 | 22.16 | 8.55 | 3.81 |
| d11 | 6.50 | 6.83 | 6.40 |
| d19 | 1.35 | 0.91 | 0.78 |
| d21 | 35.15 | 52.16 | 63.16 |

Lens unit data

| Unit | Start surface | Focal length |
|---|---|---|
| 1 | 1 | 105.29 |
| 2 | 4 | −15.61 |
| 3 | 10 | 76.54 |
| 4 | 12 | 276.55 |
| 5 | 20 | 29.30 |

[Numerical Data 2]

[unit: mm]

Surface data

| Surface number | r | d | nd | vd |
|---|---|---|---|---|
| 1 | 50.263 | 1.50 | 1.84666 | 23.8 |
| 2 | 38.708 | 5.77 | 1.65160 | 58.5 |
| 3 | 307.011 | (variable) | | |
| 4* | 38.523 | 1.10 | 1.95375 | 32.3 |
| 5 | 10.858 | 6.82 | | |
| 6 | −40.949 | 0.90 | 1.65844 | 50.9 |
| 7 | 27.291 | 1.00 | | |
| 8 | 22.625 | 2.65 | 1.89286 | 20.4 |
| 9 | 346.462 | (variable) | | |
| 10 | −144.105 | 1.50 | 1.48749 | 70.2 |
| 11 | −31.973 | 1.50 | | |
| 12(stop) | ∞ | (variable) | | |
| 13 | −34.224 | 0.80 | 1.77250 | 49.6 |
| 14 | −267.275 | (variable) | | |
| 15 | 11.193 | 4.16 | 1.49700 | 81.5 |
| 16 | 82.620 | 0.30 | | |
| 17 | 21.750 | 4.18 | 1.53775 | 74.7 |
| 18 | −18.579 | 1.00 | 1.90366 | 31.3 |
| 19 | −25.563 | 0.54 | | |
| 20* | −95.955 | 1.00 | 1.83220 | 40.1 |
| 21* | 30.818 | (variable) | | |
| Image plane | ∞ | | | |

Aspheric surface data

4th surface

K = 0.00000e+000
A4 = 3.40292e−006
A6 = −1.01860e−008
A8 = 9.24689e−012
20th surface K = 0.00000e+000
A4 = −2.08307e−004
A6 = 2.91060e−006
A8 = −1.29153e−007
A10 = 3.29179e−009
A12 = −3.47581e−011
21st surface K = −3.91679e+001
A4 = 1.29989e−004
A6 = 7.26953e−007
A8 = −4.36629e−008
A10 = 2.14923e−009
A12 = −2.27788e−011

-continued

[unit: mm]

Various data
Zoom ratio 3.25

| | Wide angle | Middle | Telephoto |
|---|---|---|---|
| Focal length | 16.37 | 34.52 | 53.28 |
| F-number | 3.84 | 4.98 | 5.84 |
| Half angle of view (deg) | 31.42 | 16.16 | 10.63 |
| Image height | 10.00 | 10.00 | 10.00 |
| Total lens length | 100.08 | 115.04 | 131.43 |
| BF | 35.60 | 50.02 | 59.56 |
| d3 | 1.00 | 15.73 | 27.04 |
| d9 | 20.26 | 6.37 | 2.30 |
| d12 | 6.26 | 6.33 | 6.54 |
| d14 | 2.22 | 1.85 | 1.27 |
| d21 | 35.60 | 50.02 | 59.56 |

Lens unit data

| Unit | Start surface | Focal length |
|---|---|---|
| 1 | 1 | 101.33 |
| 2 | 4 | −16.20 |
| 3 | 10 | 83.92 |
| 4 | 13 | −50.89 |
| 5 | 15 | 20.48 |

[Numerical Data 3]

[unit: mm]

Surface data

| Surface number | r | d | nd | vd |
|---|---|---|---|---|
| 1 | 46.149 | 1.60 | 1.80518 | 25.4 |
| 2 | 35.132 | 6.92 | 1.60311 | 60.6 |
| 3 | 266.045 | (variable) | | |
| 4 | 38.823 | 1.00 | 1.91082 | 35.3 |
| 5 | 11.173 | 6.60 | | |
| 6 | −54.453 | 0.85 | 1.69680 | 55.5 |
| 7 | 24.324 | 0.21 | | |
| 8 | 19.094 | 3.98 | 1.85478 | 24.8 |
| 9 | 532.538 | (variable) | | |
| 10(stop) | ∞ | 2.75 | | |
| 11 | 387.889 | 1.51 | 1.48749 | 70.2 |
| 12 | −32.737 | (variable) | | |
| 13 | −23.815 | 0.68 | 1.77250 | 49.6 |
| 14 | −547.091 | (variable) | | |
| 15 | 14.949 | 4.35 | 1.59522 | 67.7 |
| 16 | −65.249 | 0.20 | | |
| 17 | 18.168 | 4.00 | 1.72000 | 50.2 |
| 18 | −29.900 | 0.65 | 1.91082 | 35.3 |
| 19 | 17.833 | 1.22 | | |
| 20 | 54.000 | 1.70 | 1.53110 | 55.9 |
| 21* | −153.320 | (variable) | | |
| 22 | ∞ | 35.50 | | |
| Image plane | ∞ | | | |

Aspheric surface data

21st surface

K = 0.00000e+000
A4 = 1.61053e−004
A6 = 7.92230e−007
A8 = 1.89252e−008
A10 = −2.39009e−010
A12 = 3.76860e−012

Various data
Zoom ratio 2.28

| | Wide angle | Middle | Telephoto |

-continued

[unit: mm]

| Focal length | 18.57 | 34.92 | 53.41 |
|---|---|---|---|
| F-number | 4.12 | 4.93 | 5.71 |
| Half angle of view (deg) | 36.34 | 21.36 | 14.35 |
| Image height | 13.66 | 13.66 | 13.66 |
| Total lens length | 104.14 | 116.44 | 129.94 |
| BF | 35.50 | 35.50 | 35.50 |
| d3 | 0.92 | 16.52 | 26.85 |
| d9 | 21.93 | 8.73 | 3.40 |
| d12 | 4.07 | 4.14 | 4.63 |
| d14 | 2.21 | 2.14 | 1.65 |
| d21 | 1.29 | 11.18 | 19.69 |

Lens unit data

| Unit | Start surface | Focal length |
|---|---|---|
| 1 | 1 | 103.44 |
| 2 | 4 | −18.76 |
| 3 | 10 | 62.00 |
| 4 | 13 | −32.25 |
| 5 | 15 | 19.03 |
| 6 | 22 | ∞ |

[Numerical Data 4]

[unit: mm]

Surface data

| Surface number | r | d | nd | vd |
|---|---|---|---|---|
| 1 | 50.000 | 1.48 | 1.84666 | 23.8 |
| 2 | 41.418 | 4.76 | 1.71300 | 53.9 |
| 3 | 203.270 | (variable) | | |
| 4 | 36.287 | 1.00 | 1.95375 | 32.3 |
| 5 | 9.913 | 4.91 | | |
| 6* | −42.835 | 1.10 | 1.76802 | 49.2 |
| 7 | 37.510 | 0.10 | | |
| 8 | 20.227 | 2.84 | 1.92286 | 20.9 |
| 9 | −4006.687 | (variable) | | |
| 10 | ∞ | 1.83 | 1.59282 | 68.6 |
| 11 | −23.120 | 1.50 | | |
| 12(stop) | ∞ | 2.18 | | |
| 13 | 22.780 | 4.70 | 1.53775 | 74.7 |
| 14 | −9.334 | 1.00 | 1.80518 | 25.4 |
| 15 | −17.675 | 0.57 | | |
| 16 | −9.500 | 2.90 | 1.83400 | 37.2 |
| 17* | −9.226 | (variable) | | |
| 18* | 14.158 | 1.00 | 1.85135 | 40.1 |
| 19* | 7.730 | (variable) | | |
| 20 | 33.857 | 2.83 | 1.58144 | 40.8 |
| 21 | −603.167 | (variable) | | |
| Image plane | ∞ | | | |

Aspheric surface data

6th surface

K = 0.00000e+000
A4 = −1.21910e−005
A6 = −4.30589e−008
A8 = 3.99751e−010
A10 = −1.18058e−011
17th surface K = 0.00000e+000
A4 = 1.10442e−004
A6 = −7.36507e−007
A8 = 2.70190e−008
A10 = −1.59983e−010
18th surface K = 0.00000e+000
A4 = −9.45110e−004
A6 = 2.24365e−005

-continued

[unit: mm]

A8 = −3.76588e−007
A10 = 3.00125e−009
19th surface

K = 0.00000e+000
A4 = −1.31918e−003
A6 = 2.72203e−005
A8 = −5.61796e−007
A10 = 4.26501e−009

Various data
Zoom ratio 2.87

| | Wide angle | Middle | Telephoto |
|---|---|---|---|
| Focal length | 18.58 | 28.13 | 53.38 |
| F-number | 3.64 | 4.15 | 5.29 |
| Half angle of view (deg) | 28.28 | 19.57 | 10.61 |
| Image height | 10.00 | 10.00 | 10.00 |
| Total lens length | 79.30 | 90.34 | 115.50 |
| BF | 18.85 | 25.06 | 41.51 |
| d3 | 1.10 | 11.98 | 27.44 |
| d9 | 13.62 | 7.35 | 0.82 |
| d17 | 3.76 | 3.20 | 1.10 |
| d19 | 7.27 | 8.05 | 9.93 |
| d21 | 18.85 | 25.06 | 41.51 |

Lens unit data

| Unit | Start surface | Focal length |
|---|---|---|
| 1 | 1 | 95.93 |
| 2 | 4 | −17.62 |
| 3 | 10 | 16.23 |
| 4 | 18 | −21.54 |
| 5 | 20 | 55.23 |

[Numerical Data 5]

[unit: mm]

Surface data

| Surface number | r | d | nd | vd |
|---|---|---|---|---|
| 1 | 50.207 | 1.50 | 1.84666 | 23.8 |
| 2 | 33.336 | 7.58 | 1.72000 | 50.2 |
| 3 | 268.925 | (variable) | | |
| 4 | 42.581 | 1.10 | 1.90043 | 37.4 |
| 5 | 11.665 | 7.84 | | |
| 6 | −53.113 | 0.90 | 1.59522 | 67.7 |
| 7 | 25.160 | 0.30 | | |
| 8 | 20.130 | 3.28 | 1.85478 | 24.8 |
| 9 | 106.753 | (variable) | | |
| 10(stop) | ∞ | 2.20 | | |
| 11 | 725.432 | 1.38 | 1.64000 | 60.1 |
| 12 | −44.098 | (variable) | | |
| 13 | −41.409 | 0.80 | 1.80400 | 46.6 |
| 14 | −485.697 | (variable) | | |
| 15 | 16.936 | 2.38 | 1.75500 | 52.3 |
| 16 | 50.548 | 0.20 | | |
| 17 | 18.924 | 0.80 | 1.89190 | 37.1 |
| 18 | 12.345 | 3.31 | 1.65160 | 58.5 |
| 19 | 87.608 | 1.25 | | |
| 20 | 123.604 | 0.75 | 1.85150 | 40.8 |
| 21 | 9.666 | 4.16 | 1.58313 | 59.4 |
| 22* | −103.215 | (variable) | | |
| Image plane | ∞ | | | |

Aspheric surface data

22th surface

K = −7.20897e+002
A4 = −1.51321e−005

-continued

[unit: mm]

A6 = 2.42790e−006
A8 = −4.96675e−008
A10 = 6.94423e−010
A12 = −3.88085e−012

Various data
Zoom ratio 3.17

|  | Wide angle | Middle | Telephoto |
|---|---|---|---|
| Focal length | 18.54 | 35.23 | 58.79 |
| F-number | 4.12 | 4.93 | 5.82 |
| Half angle of view (deg) | 28.34 | 15.85 | 9.65 |
| Image height | 10.00 | 10.00 | 10.00 |
| Total lens length | 108.36 | 120.09 | 135.57 |
| BF | 35.91 | 46.09 | 55.56 |
| d3 | 0.90 | 15.20 | 27.02 |
| d9 | 22.28 | 9.54 | 3.72 |
| d12 | 4.71 | 5.81 | 7.56 |
| d14 | 4.83 | 3.73 | 1.98 |
| d22 | 35.91 | 46.09 | 55.56 |

Lens unit data

| Unit | Start surface | Focal length |
|---|---|---|
| 1 | 1 | 94.07 |
| 2 | 4 | −18.26 |
| 3 | 10 | 65.00 |
| 4 | 13 | −56.35 |
| 5 | 15 | 24.96 |

TABLE 1

|  |  | Embodiment | | | | |
|---|---|---|---|---|---|---|
|  |  | 1 | 2 | 3 | 4 | 5 |
| fw |  | 17.524 | 16.372 | 18.567 | 18.584 | 18.540 |
| ft |  | 58.587 | 53.275 | 53.410 | 53.383 | 58.786 |
| f1 |  | 105.287 | 101.326 | 103.435 | 95.935 | 94.073 |
| f2 |  | −15.607 | −16.196 | −18.758 | −17.622 | −18.264 |
| f3 |  | 76.539 | 83.920 | 62.000 | 16.230 | 65.000 |
| f4 |  | 276.550 | −50.886 | −32.250 | −21.539 | −56.349 |
| f5 |  | 29.298 | 20.482 | 19.027 | 55.225 | 24.957 |
| ft/fw |  | 3.343 | 3.254 | 2.877 | 2.873 | 3.171 |
| R1P1 |  | 330.831 | −144.105 | 387.889 | 0.000 | 725.432 |
| R2P1 |  | −41.976 | −31.973 | −32.737 | −23.120 | −44.098 |
| β2w |  | −0.191 | −0.207 | −0.245 | −0.243 | −0.271 |
| β2t |  | −0.292 | −0.310 | −0.370 | −0.381 | −0.442 |
| β3w |  | 2.965 | 2.604 | 20.650 | −0.449 | 10.512 |
| β3t |  | 1.797 | 1.730 | 3.232 | −0.630 | 3.007 |
| β4w |  | 1.253 | 0.264 | 0.026 | 2.828 | 0.083 |
| β4t |  | 0.891 | 0.425 | 0.184 | 10.646 | 0.290 |
| β5w |  | −0.234 | −1.136 | −1.382 | 0.628 | −0.835 |
| β5t |  | −1.190 | −2.306 | −2.349 | 0.218 | −1.622 |
| D23w |  | 22.163 | 20.261 | 24.680 | 13.623 | 24.481 |
| D23t |  | 3.807 | 2.295 | 6.153 | 0.821 | 5.920 |
| fP |  | 76.539 | 83.920 | 62.000 | 39.000 | 65.000 |
| fR |  | 27.115 | 26.014 | 26.906 | 25.333 | 28.479 |
| βPw |  | 2.965 | 2.604 | 20.650 | 9.119 | 10.512 |
| Conditional | (1)SFP1 | −0.775 | −1.570 | −0.844 | −1.000 | −0.885 |
| Expression | (2)βst/βsw | 0.925 | 0.995 | 0.237 | 2.201 | 0.467 |
|  | (3)D23w/D23t | 5.821 | 8.827 | 4.011 | 16.598 | 4.135 |
|  | (4)|1 − βPw| | 1.965 | 1.604 | 19.650 | 8.119 | 9.512 |
|  | (5)fP/fRt | 2.823 | 3.226 | 2.304 | 1.539 | 2.282 |
|  | (6)fRt/fw | 1.547 | 1.589 | 1.449 | 1.363 | 1.536 |
|  | (7)(1 − βPt) × βRt | 0.845 | 0.715 | 0.964 | 1.312 | 0.944 |
|  | (8)nP | 1.48749 | 1.52249 | 1.48749 | 1.59282 | 1.64000 |
|  | (9)vP | 70.230 | 59.840 | 70.230 | 68.630 | 60.080 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-241043, filed Dec. 13, 2016, which is hereby incorporated by reference herein in its entirety.

What is claimed is:

1. A zoom lens comprising in order from an object side to an image side:
a first lens unit having a positive refractive power;
a second lens unit having a negative refractive power; and
a rear lens group which includes at least one lens unit and has a positive refractive power as a whole,
wherein:
intervals between adjacent lens units are changed during zooming,
interval between the first lens unit and the second lens unit is longer at a telephoto end than at a wide angle end,
interval between the second lens unit and the rear lens group is a shorter at a telephoto end than a wide angle end,
the rear lens group includes a lens P1 that has a positive refractive power and moves for image stabilization so as to have a component perpendicular to an optical axis, a surface of the lens P1 on the object side and a surface of the lens P1 on the image side are both in contact with air, the lens P1 is a lens disposed at most object side in the rear lens group, and the following conditional expression is satisfied:

$$-2.5 < SFP1 \leq -0.844$$

where SFP1 is a shape factor of the lens P1 which is expressed by SFP1=(R2P1+R1P1)/(R2P1−R1P1), R1P1 is a curvature radius of a lens surface of the lens P1 on the object side while R2P1 is a curvature radius of a lens surface of the lens P1 on the image side, wherein the rear lens group includes in order from the object side to the image side: a third lens unit having a positive refractive power; a fourth lens group having a positive refractive power; and a fifth lens group having a positive refractive power, and wherein the third lens unit is composed of one positive lens, which is the lens P1.

2. The zoom lens according to claim 1, wherein the following conditional expression is satisfied:

$$0.01 < \beta st/\beta sw < 3.20$$

where βsw is a lateral magnification of a composite system of the second lens unit to the lens P1 at a wide-angle end and βst is a lateral magnification of the composite system of the second lens unit to the lens P1 at a telephoto end.

3. The zoom lens according to claim 1, wherein the following conditional expression is satisfied:

$$1.8 < D23w/D23t < 20.0$$

where D23w is a distance between the second and third lens units on the optical axis at the wide-angle end and D23t is a distance between the second and third lens units on the optical axis at the telephoto end.

4. The zoom lens according to claim 1, wherein the following conditional expression is satisfied:

$$1.0 < |-\beta Pw| < 25.0$$

where βfP is a lateral magnification of the lens P1 at the wide-angle end.

5. The zoom lens according to claim 1, wherein the following conditional expression is satisfied:

$$1.1 < fP/fRt < 4.8$$

where fP is a focal length of the lens P1 and fRt is a focal length of the rear lens group at the telephoto end.

6. The zoom lens according to claim 1, wherein the following conditional expression is satisfied:

$$0.7 < fRt/fw < 2.0$$

where fRt is a focal length of the rear lens group at the telephoto end and fw is a focal length of the zoom lens at the wide-angle end.

7. The zoom lens according to claim 1, wherein the following conditional expression is satisfied:

$$0.5 < (1-\beta Pt)\Box\beta Rt < 1.8$$

where βPt is a lateral magnification of the lens P1 at the telephoto end and βRt is a lateral magnification of an optical system provided on the image side of the lens P1 at the telephoto end.

8. The zoom lens according to claim 1, wherein the following conditional expressions are satisfied:

$$1.45 < nP < 1.75$$

$$45.0 < vP < 100.0$$

where nP and vP are a refractive power and an Abbe number of a material of the lens P1 for the d-line, respectively.

9. An image pickup apparatus comprising a zoom lens and an image pickup element receiving an image formed by the zoom lens, wherein the zoom lens includes in order from an object side to an image side: a first lens unit having a positive refractive power; a second lens unit having a negative refractive power; and at least one lens unit, wherein the zoom lens includes a rear lens group having a positive refractive power as a whole, and distances between adjacent lens units change during zooming, wherein:

interval between the first lens unit and the second lens unit is longer at a telephoto end than at a wide angle end, interval between the second lens unit and the rear lens group is a shorter at a telephoto end than a wide angle end, the rear lens group includes a lens P1 that has a positive refractive power and moves at image stabilization so as to have a component perpendicular to an optical axis, the lens P1 is a lens disposed at most object side in the rear lens group, and a surface of the lens P1 on the object side and a surface of the lens P1 on the image side are both in contact with air, wherein the following conditional expression is satisfied:

$$-2.5 < SFP1 \leq -0.844$$

where SFP1 is a shape factor of the lens P1 which is expressed by SFP1=(R2P1+R1P1)/(R2P1−R1P1), R1P1 is a curvature radius of a lens surface of the lens P1 on the object side while R2P1 is a curvature radius of a lens surface of the lens P1 on the image side, wherein the rear lens group includes in order from the object side to the image side: a third lens unit having a positive refractive power; a fourth lens group having a positive refractive power; and a fifth lens group having a positive refractive power, and wherein the third lens unit is composed of one positive lens, which is the lens P1.

10. A zoom lens comprising in order from an object side to an image side:

a first lens unit having a positive refractive power;

a second lens unit having a negative refractive power; and a rear lens group which includes at least one lens unit and has a positive refractive power as a whole, wherein:

intervals between adjacent lens units are changed during zooming, interval between the first lens unit and the second lens unit is longer at a telephoto end than at a wide angle end, interval between the second lens unit and the rear lens group is a shorter at a telephoto end than a wide angle end, the rear lens group includes in order from the object side to the image side: a third lens unit having a positive refractive power; a fourth lens group having a positive refractive power; and a fifth lens group having a positive refractive power, or, the rear lens group includes in order from the object side to the image side: a third lens unit having a positive refractive power; a fourth lens group having a negative refractive power; and a fifth lens group having a positive refractive power, and the third lens unit is composed of a lens P1 that has a positive refractive power and moves for image stabilization so as to have a component perpendicular to an optical axis, a surface of the lens P1 on the object side and a surface of the lens P1 on the image side are both in contact with air, the lens P1 is a lens disposed at most object side in the rear lens group, and the following conditional expression is satisfied:

$-2.5 < SFP1 < -0.5$ where SFP1 is a shape factor of the lens P1 which is expressed by SFP1=(R2P1+R1P1)/(R2P1−R1P1), R1P1 is a curvature radius of a lens surface of the lens P1 on the object side while R2P1 is a curvature radius of a lens surface of the lens P1 on the image side.

11. A zoom lens comprising in order from an object side to an image side:

a first lens unit having a positive refractive power;
a second lens unit having a negative refractive power; and
a rear lens group which includes at least one lens unit and has a positive refractive power as a whole, wherein:
intervals between adjacent lens units are changed during zooming,
interval between the first lens unit and the second lens unit is longer at a telephoto end than at a wide angle end,
interval between the second lens unit and the rear lens group is a shorter at a telephoto end than a wide angle end,
the rear lens group includes in order from the object side to the image side: a third lens unit having a positive refractive power; a fourth lens group having a negative refractive power; and a fifth lens group having a positive refractive power, and
the third lens unit is composed of a plurality of lenses including a lens P1 placed closest to the object, the lens P1 having a positive refractive power and configured to move for image stabilization so as to have a component perpendicular to an optical axis,
a surface of the lens P1 on the object side and a surface of the lens P1 on the image side are both in contact with air,
the lens P1 is a lens disposed at most object side in the rear lens group, and
the following conditional expression is satisfied:

$-2.5 < SFP1 < -0.5$ where SFP1 is a shape factor of the lens P1 which is expressed by SFP1=(R2P1+R1P1)/(R2P1−R1P1), R1P1 is a curvature radius of a lens surface of the lens P1 on the object side while R2P1 is a curvature radius of a lens surface of the lens P1 on the image side.

12. A zoom lens comprising in order from an object side to an image side:

a first lens unit having a positive refractive power;
a second lens unit having a negative refractive power; and
a rear lens group which includes at least one lens unit and has a positive refractive power as a whole, wherein:
intervals between adjacent lens units are changed during zooming,
interval between the first lens unit and the second lens unit is longer at a telephoto end than at a wide angle end,
interval between the second lens unit and the rear lens group is a shorter at a telephoto end than a wide angle end,
the rear lens group includes a lens P1 that has a positive refractive power and moves for image stabilization so as to have a component perpendicular to an optical axis,
a surface of the lens P1 on the object side and a surface of the lens P1 on the image side are both in contact with air,
the lens P1 is a lens disposed at most object side in the rear lens group, and
the following conditional expression is satisfied:

$-2.5 < SFP1 \leq -0.844$ where SFP1 is a shape factor of the lens P1 which is expressed by SFP1=(R2P1+R1P1)/(R2P1−R1P1), R1P1 is a curvature radius of a lens surface of the lens P1 on the object side while R2P1 is a curvature radius of a lens surface of the lens P1 on the image side, wherein the rear lens group includes in order from the object side to the image side: a third lens unit having a positive refractive power; a fourth lens group having a negative refractive power; and a fifth lens group having a positive refractive power, and wherein the third lens unit is composed of one positive lens, which is the lens P1.

13. A zoom lens comprising in order from an object side to an image side:

a first lens unit having a positive refractive power;
a second lens unit having a negative refractive power; and
a rear lens group which includes at least one lens unit and has a positive refractive power as a whole, wherein:
intervals between adjacent lens units are changed during zooming,
interval between the first lens unit and the second lens unit is longer at a telephoto end than at a wide angle end,
interval between the second lens unit and the rear lens group is a shorter at a telephoto end than a wide angle end,
the rear lens group includes a lens P1 that has a positive refractive power and moves for image stabilization so as to have a component perpendicular to an optical axis,
a surface of the lens P1 on the object side and a surface of the lens P1 on the image side are both in contact with air,
the lens P1 is a lens disposed at most object side in the rear lens group, and
the following conditional expression is satisfied:

$-2.5 < SFP1 \leq -0.844$ where SFP1 is a shape factor of the lens P1 which is expressed by SFP1=(R2P1+R1P1)/(R2P1−R1P1), R1P1 is a curvature radius of a lens surface of the lens P1 on the object side while R2P1 is a curvature radius of a lens surface of the lens P1 on the image side, wherein the rear lens group includes in order from the object side to the image side: a third lens unit having a positive refractive power; a fourth lens group having a negative refractive power; and a fifth lens group having a positive refractive power, and wherein the third lens unit is composed of a plurality of lenses including the positive lens P1 placed closest to the object.

\* \* \* \* \*